United States Patent
Pontiff et al.

(10) Patent No.: US 10,616,666 B1
(45) Date of Patent: Apr. 7, 2020

(54) INTERACTIVE SENTIMENT-DETECTING VIDEO STREAMING SYSTEM AND METHOD

(71) Applicant: Halogen Networks, LLC, Winter Park, FL (US)

(72) Inventors: Nicholas Pontiff, Orlando, FL (US); John Li, Orlando, FL (US); Stephen Kirkland, Orlando, FL (US); Brian Drehoff, Casselberry, FL (US); David Cyman, Winter Park, FL (US); Henry Pate, Casselberry, FL (US); Jacob Quattrocchi, Winter Park, FL (US); Timothy Ashley, Deland, FL (US); Dwight Doane, Orlando, FL (US); Patrick Francis Matthews, Winter Springs, FL (US); Joseph Austin Musice, Orlando, FL (US); Thomas Steven Miller, Winter Park, FL (US)

(73) Assignee: HALOGEN NETWORKS, LLC, Winter Park, FL (US)

( * ) Notice: Subject to any disclaimer, the term of this patent is extended or adjusted under 35 U.S.C. 154(b) by 0 days.

(21) Appl. No.: 16/283,492

(22) Filed: Feb. 22, 2019

Related U.S. Application Data

(60) Provisional application No. 62/669,788, filed on May 10, 2018, provisional application No. 62/636,091, filed on Feb. 27, 2018, provisional application No. 62/636,080, filed on Feb. 27, 2018.

(51) Int. Cl.
*H04N 21/8545* (2011.01)
*G06T 11/20* (2006.01)
*H04N 21/2187* (2011.01)
*G06T 13/80* (2011.01)
*H04N 21/81* (2011.01)

(52) U.S. Cl.
CPC ....... *H04N 21/8545* (2013.01); *G06T 11/203* (2013.01); *G06T 13/80* (2013.01); *H04N 21/2187* (2013.01); *H04N 21/816* (2013.01)

(58) Field of Classification Search
CPC ............ H04N 21/8545; H04N 21/816; H04N 21/2187; G06T 13/80; G06T 11/203
See application file for complete search history.

(56) References Cited

U.S. PATENT DOCUMENTS

| | | |
|---|---|---|
| 5,974,398 A | 10/1999 | Hanson et al. |
| 7,038,474 B2 | 5/2006 | Mcginnis et al. |
| 7,076,463 B1 | 7/2006 | Boies et al. |

(Continued)

*Primary Examiner* — Junior O Mendoza
(74) *Attorney, Agent, or Firm* — Knobbe, Martens, Olson & Bear, LLP

(57) ABSTRACT

Embodiments of the systems, methods, and computer readable medium devices disclosed herein provide a sentiment analysis system that can determine sentiment from an input of a user received from a device. Once the input is received, parsing and analysis can be performed to determine a particular sentiment corresponding to the input. The system can determine an overall sentiment of some or all of the users or viewers watching a particular video stream, such as a live video stream. The determined overall sentiment can represent a metric indicating what users generally feel about a portion of the video stream, and the system can use the determination to cause modification of the video stream or a future video stream to enhance the user experience.

20 Claims, 16 Drawing Sheets

(56) References Cited

U.S. PATENT DOCUMENTS

| | | |
|---|---|---|
| 7,657,651 B2 | 2/2010 | Amini et al. |
| 7,689,905 B1 | 3/2010 | Farn et al. |
| 7,711,900 B2 | 5/2010 | Booth et al. |
| 7,716,263 B2 | 5/2010 | Masek |
| 7,739,340 B2 | 6/2010 | Arenburg et al. |
| 7,746,998 B2 | 6/2010 | Flores et al. |
| 7,752,315 B2 | 7/2010 | Da Palma et al. |
| 7,756,157 B2 | 7/2010 | Bellwood et al. |
| 7,756,973 B2 | 7/2010 | Alt et al. |
| 7,770,161 B2 | 8/2010 | Mitran et al. |
| 7,801,824 B1 | 9/2010 | Bryar et al. |
| 9,117,227 B1 | 8/2015 | Agrawal et al. |
| 9,356,806 B2 | 5/2016 | Chowdhury et al. |
| 9,361,322 B1 | 6/2016 | Dutta et al. |
| 9,462,340 B1 | 10/2016 | Mathurin |
| 9,621,932 B2 | 4/2017 | Pettis et al. |
| 10,516,629 B2 * | 12/2019 | Wang .................... G06F 3/0484 |
| 2004/0123323 A1 | 6/2004 | Russo |
| 2004/0181807 A1 | 9/2004 | Theiste et al. |
| 2006/0041444 A1 | 2/2006 | Flores et al. |
| 2006/0066325 A1 | 3/2006 | Mcginnis et al. |
| 2007/0130345 A1 | 6/2007 | Da Palma et al. |
| 2007/0130359 A1 | 6/2007 | Amini et al. |
| 2007/0150880 A1 | 6/2007 | Mitran et al. |
| 2007/0255830 A1 | 11/2007 | Alt et al. |
| 2008/0071868 A1 | 3/2008 | Arenburg et al. |
| 2008/0222352 A1 | 9/2008 | Booth et al. |
| 2008/0310445 A1 | 12/2008 | Bellwood et al. |
| 2012/0089681 A1 | 4/2012 | Chowdhury et al. |
| 2013/0286211 A1 | 10/2013 | Cao |
| 2013/0347046 A1 | 12/2013 | Bluvband et al. |
| 2014/0122601 A1 | 5/2014 | Poston et al. |
| 2014/0143439 A1 | 5/2014 | Ramamurthy |
| 2014/0289785 A1 | 9/2014 | Alexander |
| 2015/0089514 A1 | 3/2015 | Grewal et al. |
| 2015/0149281 A1 | 5/2015 | Carrotte et al. |
| 2015/0189018 A1 | 7/2015 | Cassidy et al. |
| 2015/0215661 A1 | 7/2015 | Wang et al. |
| 2015/0227624 A1 | 8/2015 | Busch et al. |
| 2015/0312236 A1 | 10/2015 | Ducker et al. |
| 2015/0362917 A1 | 12/2015 | Wang et al. |
| 2015/0378584 A1 | 12/2015 | Folgner et al. |
| 2016/0007052 A1 | 1/2016 | Haitsuka et al. |
| 2016/0028673 A1 | 1/2016 | Jeyaraman et al. |
| 2016/0029102 A1 | 1/2016 | Daily et al. |
| 2016/0048864 A1 | 2/2016 | Beer et al. |
| 2016/0057457 A1 | 2/2016 | Clements et al. |
| 2016/0066002 A1 | 3/2016 | Dachiraju et al. |
| 2016/0080525 A1 | 3/2016 | Ward |
| 2016/0080820 A1 | 3/2016 | Lee et al. |
| 2017/0093769 A1 | 3/2017 | Lind et al. |
| 2017/0359285 A1 * | 12/2017 | Weinig .................... H04L 67/02 |
| 2019/0149878 A1 * | 5/2019 | Fransen ............. G06K 9/00711 |
| | | 725/14 |
| 2019/0190865 A1 * | 6/2019 | Jeon ...................... H04L 51/046 |

\* cited by examiner

FIG. 10

INTERACTIVE SENTIMENT-DETECTING VIDEO STREAMING SYSTEM AND METHOD

CROSS-REFERENCE TO RELATED APPLICATIONS

This application claims the benefit of priority under 35 U.S.C. § 119(e) of U.S. Provisional Patent Application No. 62/636,080, filed Feb. 27, 2018 and titled "LIVE VIDEO STREAMING SYSTEM AND METHOD," U.S. Provisional Patent Application No. 62/636,091, filed Feb. 27, 2018 and titled "LIVE VIDEO STREAMING SYSTEM AND METHOD," and U.S. Provisional Patent Application No. 62/669,788, filed May 10, 2018 and titled "LIVE VIDEO STREAMING SYSTEM AND METHOD," which are hereby incorporated by reference herein in their entireties.

Some technology described in this application is also related to U.S. patent application Ser. No. 15/298,012, filed Oct. 19, 2016 and titled "LIVE VIDEO STREAMING SYSTEM AND METHOD," which claims priority under 35 U.S.C. § 119(e) to U.S. Provisional Patent Application No. 62/244,027, filed Oct. 20, 2015 and titled "LIVE VIDEO STREAMING SYSTEM AND METHOD" ("the '027 provisional patent application"), and U.S. Provisional Patent Application No. 62/332,312, filed May 5, 2016 and titled "LIVE VIDEO STREAMING SYSTEM AND METHOD" ("the '312 provisional patent application"), and related to U.S. patent application Ser. No. 15/298,017, filed Oct. 19, 2016 and titled "LIVE VIDEO STREAMING SYSTEM AND METHOD," which claims priority under 35 U.S.C. § 119(e) to the '027 provisional patent application and the '312 provisional patent application, which are hereby incorporated by reference herein in their entireties.

SUMMARY

The systems, methods, and devices described herein each have several aspects, no single one of which is solely responsible for its desirable attributes. Without limiting the scope of this disclosure, several non-limiting features will now be discussed briefly.

As described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of resource dependency, or data transformation, relationships and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Another aspect of the disclosure provides a video streaming system. The video streaming system comprising: one or more data storage devices configured to store: animations associated with one or more sentiments; and a plurality of computer-executable instructions; one or more hardware computer processors in communication with the one or more data storage devices, the one or more hardware computer processors, when executing the plurality of computer executable instructions, configured to: process at least a portion of a video stream broadcast by a first broadcaster device; transmit a subset of the portion of the video stream to a first viewer device, wherein the first viewer device is configured to store and execute a video streaming application with an expression style mode; transmit the subset of the portion of the video stream to a second viewer device, wherein the second viewer device is configured to store and execute the video streaming application with the expression style mode; process input data received from the first viewer device; parse the input data to determine a first sentiment associated with the input data; transmit, to the first viewer device, first instructions for displaying an animation associated with the determined first sentiment concurrently with display of the video stream; determine an overall sentiment based at least in part on the input data received from the first viewer device and second input data received from the second viewer device; and in response to the determination of the overall sentiment: transmit, to the first viewer device, second instructions for displaying an animation associated with the overall sentiment concurrently with display of the video stream; and transmit, to the second viewer device, third instructions for displaying an animation associated with the overall sentiment concurrently with display of the video stream. The system can also comprise one or more concepts, such as: wherein the input data received from the first viewer device comprises an image drawn by a user associated with the first viewer device within a user interface presented by the first viewer device; wherein the one or more hardware computer processors are further configured to determine a confidence level associated with the determined first sentiment; wherein the determined confidence level is above a threshold confidence level; wherein the first instructions cause the first viewer device to display the animation associated with the determined first sentiment in a first layer and to display the video stream in a second layer, and wherein the first layer overlays the second layer; wherein the first instructions cause the first viewer device to display the animation in a first portion of a user interface and to display the video stream in a second portion of the user interface that is different than the first portion; wherein an intensity of the animation associated with the overall sentiment is based on one of a number or percentage of viewers watching the video stream that expressed the overall sentiment; wherein the input data received from the first viewer device is associated with a first time that falls within a first time interval, wherein the second input data received from the second viewer device is associated with a second time that falls within the first time interval, and wherein third input data received from a third viewer device is associated with a third time that does not fall within the first time interval; wherein the one or more hardware computer processors are further configured to determine the overall sentiment based on the input data, the second input data, and any other input data associated with a time that falls within the first time interval; wherein the video stream comprises a live video stream; wherein the input data comprises a time associated with first sentiment received from the first viewer device; and/or wherein the displayed animation associated with the determined first sentiment is overlaid on a portion of a screen of the first viewing device. The system can also comprise: wherein the one or more hardware computer processors are further configured to: compare the image drawn by the user with a plurality of shapes; determine that the image drawn by the user corresponds to a first shape in the plurality of shapes; determine that the first shape is associated with the first sentiment; and associate the first sentiment with the image drawn by the user. The system can also comprise: wherein the one or more hardware computer processors are further configured to: apply the input data as an input to a trained artificial intelligence model, wherein the trained artificial intelligence model outputs an indication of the first sentiment as a result of the application; and associate the first sentiment with the image drawn by the user.

Another aspect of the disclosure provides a computer-implemented method of streaming video. The method of streaming video comprising: processing at least a portion of a video stream broadcast by a first broadcaster device; transmitting a subset of the portion of the video stream to a first viewer device, wherein the first viewer device is configured to store and execute a video streaming application with an expression style mode; transmitting the subset of the portion of the video stream to a second viewer device, wherein the second viewer device is configured to store and execute the video streaming application with the expression style mode; processing input data received from the first viewer device; parsing the input data to determine a first sentiment associated with the input data; transmitting, to the first viewer device, first instructions for displaying an animation associated with the determined first sentiment concurrently with display of the video stream; determining an overall sentiment based at least in part on the input data received from the first viewer device and second input data received from the second viewer device; and in response to the determination of the overall sentiment: transmitting, to the first viewer device, second instructions for displaying an animation associated with the overall sentiment concurrently with display of the video stream; and transmitting, to the second viewer device, third instructions for displaying an animation associated with the overall sentiment concurrently with display of the video stream. The computer-implemented method can also comprise: wherein the input data received from the first viewer device comprises an image drawn by a user associated with the first viewer device within a user interface presented by the first viewer device. The computer-implemented method can also comprise: wherein parsing the input data to determine a first sentiment associated with the input data further comprises: comparing the image drawn by the user with a plurality of shapes; determining that the image drawn by the user corresponds to a first shape in the plurality of shapes; determining that the first shape is associated with the first sentiment; and associating the first sentiment with the image drawn by the user.

Another aspect of the disclosure provides a non-transitory computer-readable medium storing a set of instructions that are executable by one or more processors to cause the one or more processors to: process at least a portion of a video stream broadcast by a first broadcaster device; transmit a subset of the portion of the video stream to a first viewer device, wherein the first viewer device is configured to store and execute a video streaming application with an expression style mode; transmit the subset of the portion of the video stream to a second viewer device, wherein the second viewer device is configured to store and execute the video streaming application with the expression style mode; process input data received from the first viewer device; parse the input data to determine a first sentiment associated with the input data; transmit, to the first viewer device, first instructions for displaying an animation associated with the determined first sentiment concurrently with display of the video stream; determine an overall sentiment based at least in part on the input data received from the first viewer device and second input data received from the second viewer device; and in response to the determination of the overall sentiment: transmit, to the first viewer device, second instructions for displaying an animation associated with the overall sentiment concurrently with display of the video stream; and transmit, to the second viewer device, third instructions for displaying an animation associated with the overall sentiment concurrently with display of the video stream. The non-transitory computer-readable medium can also comprise: wherein the input data received from the first viewer device comprises an image drawn by a user associated with the first viewer device within a user interface presented by the first viewer device. The non-transitory computer-readable medium can also comprise: wherein the one or more hardware computer processors are further configured to: wherein the set of instructions, when executed, further cause the one or more processors to: compare the image drawn by the user with a plurality of shapes; determine that the image drawn by the user corresponds to a first shape in the plurality of shapes; determine that the first shape is associated with the first sentiment; and associate the first sentiment with the image drawn by the user.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

The features disclosed herein are described below with reference to the drawings. The drawings are provided to illustrate embodiments of the inventions described herein and not to limit the scope thereof.

FIG. 10 depicts another example user interface for viewing video upload metrics data.

DESCRIPTION OF EMBODIMENTS

Figure 1:
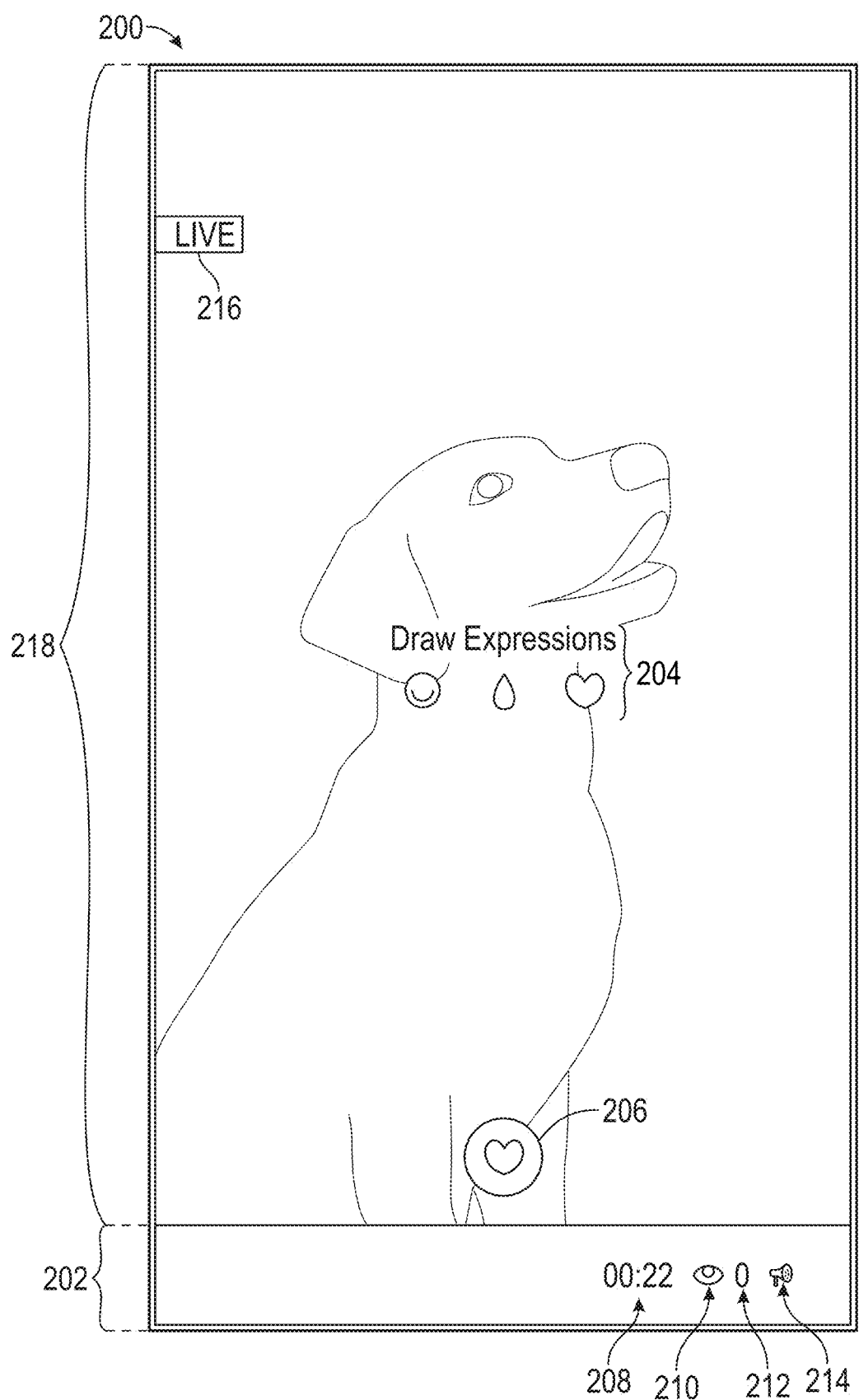
FIG. 1 depicts an example user interface for viewing a video stream.

The headings provided herein, if any, are for convenience only and do not necessarily affect the scope or meaning of the claimed invention.

This disclosure describes embodiments of a mobile application and associated system that enables live streaming and access to live streaming events. In certain embodiments, the mobile application and associated system enables users to create live video streams for friends and followers, earn money by charging for stream access (or provide free access to streams), and view streams from friends and followers. Users can subscribe to favorite streamers to receive exclusive access to their streams.

Example Sentiment Analysis System

In one embodiment, a system can determine sentiment from an input of a user received from a device. The user input can be received in multiple ways. For example, a user can select a physical or virtual button or user interface element presented by the device, speak aloud (e.g., detected via a microphone of the device, or the like), make a facial expression (e.g., images or video of the facial expression detected via a camera of the device, or the like), draw a shape on a screen of the device with a finger or stylus (e.g., the screen may be enabled to detect touch inputs), draw a shape in the air with a finger or stylus (e.g., movements detected via a component of the device, such as a camera, radar, laser, motion sensor, or the like), draw a shape in the air while holding the device (e.g., movements detected via a component of the device, such as an accelerometer, gyroscope, altimeter, compass, or the like), type in text on the device using a virtual or physical keyboard, or any other form of input.

Once the input is received by the system, parsing and analysis can be performed by the system to determine a particular sentiment corresponding to the input. In some embodiments, the system can be a streaming back-end system 110 (FIG. 5), a sentiment analysis system 600 (FIGS. 6A and 6B), a device 120 (FIG. 5), a computing device 104 (FIG. 5), or any combination thereof. Further, "sentiment" can be used herein to describe the indicated emotional response of a user, as input on a device. For example, an emotional response can be described as "happy," "sad," "angry," "jealous," "loving," "ambivalent," or any other type of emotion or feeling.

The system can determine an overall sentiment of some or all of the users or viewers watching a particular video stream, such as a live video stream. For example, the system can aggregate the sentiments determined from inputs provided by some or all of the users to determine an overall sentiment (e.g., the system may determine the overall sentiment to be the most common sentiment of some or all of the users). The determined overall sentiment can represent a metric indicating what users generally feel about a portion of the video stream, and the system can use the determination to cause modification of the video stream or a future video stream to enhance the user experience. Examples of how the system can use the determined overall sentiment to enhance the user experience are described in greater detail below.

Optionally, the system can modify a video stream to include an animation or other indication once an overall sentiment is determined. For example, if a majority, a plurality, or other threshold number of users provide an input indicative of a "happy" emotional response at a particular time during the video stream, then the system can cause an animation or indication to be displayed to one or more users, where the animation or indication represents the overall sentiment of the viewers that are watching. The system can cause the animation or indication to be displayed concurrently with the video stream, such as while the video stream continues to play on a device. The system can cause the animation or indication to be displayed adjacent to the video stream, partially overlapping the video stream, or fully overlapping the video stream.

In some instances, the system can determine an overall sentiment without receiving inputs from a majority or other threshold number of users or viewers viewing a video stream. For example, low viewer count (e.g., 1-10 viewers) of a video stream may result in an unclear overall sentiment. Some viewers may not indicate a sentiment, while others may not provide an input frequently. The less data available from viewers, the less accurate the overall sentiment may be. The system can nonetheless determine an overall sentiment if there is a low viewer count and/or some viewers do not indicate a sentiment or do so infrequently. For example, if only 1 viewer out of 10 viewers watching a video stream indicates a "happy" sentiment, and the other 9 viewers do not indicate any sentiment, then the system may determine the overall sentiment to be "happy." Alternatively, in the same example, the system may not determine the overall sentiment unless a certain percentage or number of viewers indicates a sentiment.

In some embodiments, the system can determine overall sentiment at certain time intervals. For example, the system can receive or obtain inputs from one or more devices, and the system can determine a sentiment for each of the received inputs. As an illustrative example, the sentiment analysis system 600 can determine a sentiment for each of the received inputs. After a preconfigured or dynamically-adjustable amount of time (e.g., 3, 5, 10, 20 seconds, or the like), the system can determine the overall sentiment. Thus, the system can determine a single overall sentiment for a certain time interval. In some embodiments, a user can enter multiple inputs within a threshold time interval and the system (e.g., the sentiment analysis system 600) can use the most recent input when determining overall sentiment. In some embodiments, a user can only enter one input within a threshold time interval and the system (e.g., the sentiment analysis system 600) can use the single input when determining overall sentiment.

In some embodiments, the system causes a determined overall sentiment to be displayed only if the confidence in each viewer's sentiment is above a certain threshold level of confidence. The threshold level of confidence can be pre-programmed or set by default based on the confidence algorithms used by the system, or can be user-adjustable.

In some embodiments, the system causes the determined overall sentiment to be displayed based on whether some or every viewer's sentiment is above a certain threshold level of confidence and what percentage of viewers indicate the determined overall sentiment. For example, if the system determines with a low confidence (e.g., a confidence level for some or all of the viewers is less than 5%, 10%, 15%, etc.) that 90% of viewers indicate a "sad" emotion, the system may still cause the overall sentiment may to be displayed because while the confidence level is low, the high number of viewers indicating the same "sad" emotion may outweigh the low confidence level.

As described above, in some examples, a device can receive a user input indicative of a sentiment by drawing on a screen using a finger or stylus. An app 130 (also referred to herein as an "application" or a "mobile application"), as described in FIG. 5 below, can be installed and executed on the device (e.g., device 120 and/or computing device 104 of FIG. 5) to view a video stream, such as a live video stream (e.g., a video stream of live content, such as content that was captured within a few seconds or minutes of the video stream being available to viewers for viewing) or a taped video stream (e.g., a video stream of taped content, such as content that was captured more than a few seconds or minutes before the video stream is available to viewers for viewing and that optionally was processed or edited prior to the video stream becoming available). The app 130 can include an expression style mode that is either always active or that can be toggled on or off (e.g., with a physical or virtual button, via voice control, or the like). For example, a user can draw (e.g., with a finger, mouse, trackpad, stylus, etc.) lines, shapes, or other illustrative figures that represent emotional expressions on a user interface generated by the app 130. Such illustrative figures can include heart shapes (e.g., which show fondness of the corresponding portion of the video stream), smiley faces (e.g., which indicate that the corresponding portion of the video stream causes happiness), tears (e.g., which indicate that the corresponding portion of the video stream causes sadness), horizontal lines (e.g., which indicate ambivalence of the corresponding portion of the video stream), etc. A user can therefore use the expression style mode to show sentiment toward at least a portion of a video stream.

During a live broadcast or a taped broadcast being streamed concurrently to a plurality of users, the sentiment of a user (as expressed through the expression style mode) can be relayed via a user's device to other users and the broadcaster of the transmitting device 602 (FIGS. 6A and 6B) (e.g., the source device from which the broadcast is streamed or transmitted). For example, when a user draws a smile or smiley face on a screen, the app 130 can cause the display of the user's device to show an animation associated with the smile. The other users and/or the broadcaster may also see the animation or other indication of that user's interaction in the expression style mode. For example, the app 130 may include a post bar (e.g., a window or pane in the user interface generated by the app 130 separate from a window or pane in the user interface generated by the app 130 showing the video stream) that shows the animation, an indication of the sentiment other than animation, and/or statistics associated with the sentiment. For example, the animation can be presented in the post bar (rather than in a portion of the user interface showing the video stream or over the entire user interface itself) of a broadcaster's video stream when a user has drawn an expression. In some embodiments, the animation can be limited to presentation in the post bar such that the video stream can be viewed without any animations or other objects obscuring the content of the video stream.

As discussed herein, the system can determine overall sentiment. In some embodiments, the system can aggregate sentiments during the broadcast of a video stream. The system can cause the aggregation of the sentiments to be shown in the post bar. As one example, if a large number of viewers each draws an illustrative figure in the expression style mode, the post bar (of the broadcaster or viewer) can show a time poll representing what viewers are feeling during particular sections of the broadcast.

In some situations, certain aspects of an animation (e.g., speed or intensity of the animation, color of the animation, transparency of the animation, size of the animation, etc.) can change depending on the number or percentage of similar sentiments received from various viewers via the expression style mode during the video stream and/or the number of opposing sentiments received from various viewers via the expression style mode during the video stream. As an illustrative example, falling confetti may be an animation associated with smiley faces or happiness. If the number of smiley faces drawn by viewers far outnumber the number of tears drawn by viewers, the system may cause the confetti to fall at a fast rate. On the other hand, if the number of smiley faces drawn by viewers is barely greater than the number of tears drawn by viewers, the system may cause the confetti to fall at a slow rate. Similarly, dominant sentiments (e.g., sentiments input by a large majority of viewers) can result in animations being a certain color (e.g., bright colors), a certain transparency level (e.g., less transparent), and/or a certain size (e.g., individual objects in the animation may be large), whereas less dominant sentiments (e.g., sentiments input by a small majority of viewers or a plurality of viewers) can result in animations being a certain color (e.g., dull colors), a certain transparency level (e.g., more transparent), and/or a certain size (e.g., individual objects in the animation may be smaller). Effects of sentiments can also interact with each other. For example, if more users draw tears expressions, it may neutralize the effect of the smiley faces drawn during the live or taped broadcast.

In addition to or in alternative to drawing on a device screen, a user can also express sentiments via other types of inputs. For example, the expression style mode can support voice input (e.g., voice commands specifying certain illustrative figures to draw or certain sentiments to express), written text (e.g., a user can type or write the name of an illustrative figures or a sentiment to express), drawing in the air (e.g., the app 130 can use a device's camera to detect movements made by a user, where the user can move a figure or other object to write the name of an illustrative figure, the draw an illustrative figure, or to write the name of a sentiment to express), drawing using the device (e.g., the app 130 can use a device's accelerometer or other similar component to detect how the user moves the device, where the user can move the device to write the name of an illustrative figure, the draw an illustrative figure, or to write the name of a sentiment to express), and/or the like to extract, during a video stream, a user's sentiment toward at least a portion of the content of the video stream and/or a user's sentiment to the broadcaster.

FIG. 1 depicts an example user interface 200 for viewing a video stream as viewed by an interacting device 604, a non-interacting device 606, a device 120, and/or a computing device 104. The user interface 200 can be generated, for example, by the app 130, which can be executed by any of the interactive device 604, the non-interactive device 606, the device 120, and the computing device 104.

The user interface 200 can include two areas, windows, sections, panes, and/or the like: area 218 and post bar 202. Area 218 can show a video and various interface elements overlaid on top of the video. The video can be a video stream broadcast over a network 108 or a video file stored locally on the device displaying the user interface 200. For example, the video can be presented in a first layer within the area 218, and various interface elements can be presented in a second layer within the area 218 that is in front of or on top of the first layer. The second layer can be at least partially transparent such that the first layer, and therefore the video, is visible at least in areas of the second layer at which no interface elements are present. Thus, the app 130 may not modify the video to include the interface elements. Rather, the video and the interface elements may be separate objects that are presented in the user interface 200 concurrently. Alternatively, the app 130 can modify the video to include the interface elements. For example, the app 130 can modify some or all of the frames of the video as the frames are received over network 108 to include the interface elements at a particular position within the video. In this example, the video and the interface elements may be presented in a same layer within the area 218.

The interface elements presented in the area 218 can include a stream indicator 216, instructions 204, and a button 206. For example, area 218 can include a stream indicator 216 that can indicate to a viewer that the video shown in area 218 is a live recording that is currently being captured by a transmitting device 602 (e.g., by including the word "LIVE"). If the video is a taped recording, the area 218 may not include the stream indicator 216, or the stream indicator 216 may be modified to indicate to the viewer that the video shown in area 218 is a taped recording (e.g., by including the word "TAPED" or phrase "PREVIOUSLY RECORDED").

Area 218 can also include instructions 204 that can indicate how to interact with the user interface 200 and video content. In FIG. 1, three expressions are available to the viewer device (e.g., the device executing the app 130 that generates the user interface 200, such as the interactive device 604, the non-interactive device 606, the device 120, and/or the computing device 104) as shown in the instructions 204. The three expressions include a smiley or happy face used to indicate a happy sentiment, a tear drop used to indicate a sad sentiment, and a heart used to indicate a loving or heart-warming sentiment. In some embodiments, alternative symbols can indicate the same sentiment (e.g., a sad face can also indicate a sad sentiment, or a sun can indicate a happy sentiment). Similarly, the instructions 204 can include other expressions that represent other types of sentiments.

The sentiment analysis system 600 can detect a shape entered by a viewer and compare the entered shape to shapes associated with expressions available to the viewer device. For example, the sentiment analysis system 600 can compare the entered shape to the shape of a happy face, the shape of a tear drop, and/or the shape of a heart. If the entered shape matches any of these shapes, the sentiment analysis system 600 can determine that the viewer expressed a sentiment associated with the matching shape. The sentiment analysis system 600 can associate the determined sentiment with the viewer. The sentiment analysis system 600 can also associate the determined sentiment with a portion of the video at which the shape was entered. For example, the viewer may begin entering the shape at a particular timestamp or time code of the video (where the timestamp or time code can correspond to when the video stream started or when a viewer first connected to a video stream that had already started), at a particular time of the day, at a particular frame number of the video, etc., and the sentiment analysis system 600 can associate the determined sentiment with the timestamp, time code, time of day, or frame number corresponding to when the viewer began entering the shape. As another example, there may be a delay between when a portion of a video causes the viewer to experience a sentiment and when the viewer processes and recognizes that a sentiment was experienced. Thus, the sentiment analysis system 600 can instead associate the determined sentiment with a timestamp, time code, time of day, or frame number corresponding to a few seconds (e.g., 1 second, 2 seconds, 3 seconds, etc.) before when the viewer began entering the shape. As another example, it may take a viewer a few seconds to draw a shape corresponding to a sentiment and/or the sentiment may be experienced for a moment in the video that lasts a period of time (e.g., 1 second, 5 seconds, 20 seconds, etc.). Thus, the sentiment analysis system 600 can associate the determined sentiment with a range of timestamps, a range of time codes, a range of time within a day, or a range of frame numbers corresponding to the time it takes a viewer to draw the shape and/or the length of time of the moment in the video that caused the viewer to experience the sentiment.

If the entered shape does not match any of the shapes corresponding to the expressions presented in the instructions 204, the sentiment analysis system 600 may not initially determine what sentiment was expressed by the viewer. Optionally, the sentiment analysis system 600 can use the AI model described below to then determine what sentiment was expressed by the viewer.

After the sentiment analysis system 600 is unable to determine initially what sentiment was expressed by the viewer or independently or in place of the sentiment analysis system 600 attempting to determine what sentiment was expressed by the viewer by performing a comparison of shapes, the sentiment analysis system 600 may, through the use of artificial intelligence (AI) or machine learning, detect and apply a perceived sentiment based on any shape entered by a viewer, whether or not such shape corresponds with one of the expressions presented in instructions 204. For example, the sentiment analysis system 600 can train an AI model to detect a perceived sentiment based on a shape entered by a viewer. The sentiment analysis system 600 can train the AI model using a set of training data that includes various shapes annotated to indicate a type of sentiment associated with a respective shape. The sentiment analysis system 600 can further periodically update the AI model based on, for example, viewer feedback. For example, the AI model can output a perceived sentiment once a viewer enters a shape, and ask the viewer to confirm whether the perceived sentiment is accurate (e.g., by prompting the viewer to select a "yes" or "no" button, by prompting the viewer to say "yes" or "no," by prompting the viewer to shake the device if the perceived sentiment is inaccurate (where the shaking can be detected using an accelerometer of the device), by prompting the viewer to nod his or her head if the perceived sentiment is accurate (where the nodding can be detected using a camera of the device), by prompting the viewer to shake his or her head if the perceived sentiment is inaccurate (where the shaking can be detected using a camera of the device), etc.). As another example, the AI model can output and apply a perceived sentiment once a viewer enters a shape. If the viewer subsequently attempts to enter the same or similar shape, this may indicate that the perceived sentiment output by the AI model is inaccurate. On the other hand, if the viewer does not attempt to enter the same or similar shape after the perceived sentiment is detected, this may indicate that the perceived sentiment output by the AI model is accurate. The sentiment analysis system 600 can use the viewer feedback derived from any of the examples described above to re-train or update the AI model to improve the accuracy of the AI model in detecting perceived sentiments going forward.

Based on the training described above, the AI model can determine a sentiment of any shape, and if the determination is within a particular threshold confidence level, the AI model can register the perceived sentiment output by the AI model as the sentiment for that particular viewer for the portion of the video that the viewer was watching when the shape was entered (e.g., the timestamp(s), time code(s), time(s) of day, frame number(s), etc. of the portion of the video that the viewer was watching when the shape was entered).

Area 218 can also include a button 206 that is preconfigured, custom set by a viewer, or algorithmically determined based on a viewer's prior inputs. The button 206 can be selected to indicate a sentiment by the viewer, which currently shows a heart shape that can be associated with a particular sentiment. The button 206 can also be held down by a viewer, which causes additional buttons associated with alternative sentiments to appear for possible selection by the viewer.

Post bar 202 can include various video stream information. For example, the post bar 202 can display how much time passed since the stream was started (represented as time code 208), how much time passed since a viewer connected to the stream, icon 210 indicating the number 212 of viewers watching the stream, an icon 214 that can be used to access settings, and/or other user interface features or elements.

Figure 2A:
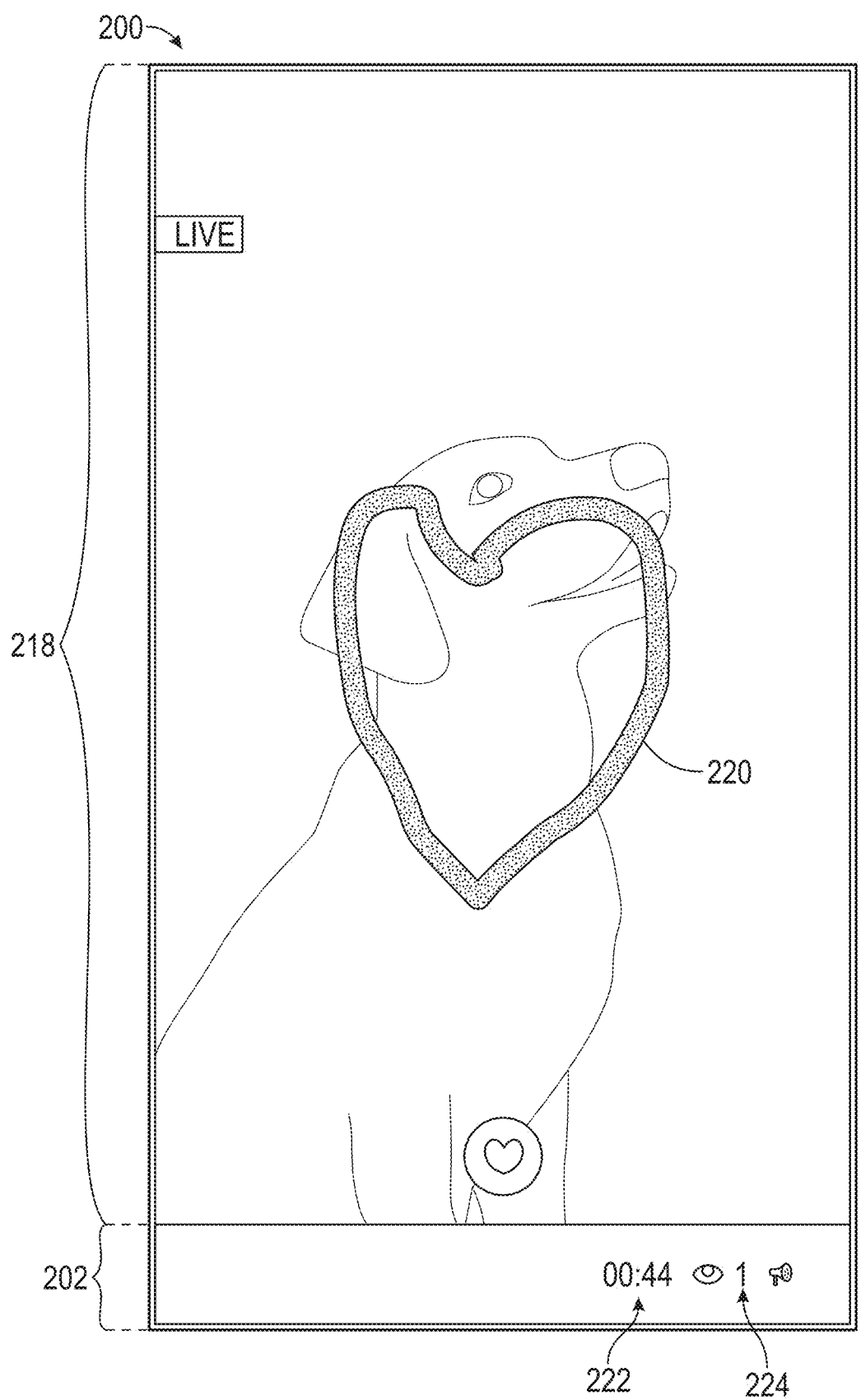
FIG. 2A depicts the example user interface of FIG. 1, depicting an example interaction with the user interface.

FIG. 2A depicts the example user interface 200 of FIG. 1, depicting an example interaction with the user interface 200 by an interacting device 604, a device 120, and/or a computing device 104. For example, a viewer can draw a shape 220, such as a heart, on the user interface 200 in area 218. The viewer can draw the shape while the user interface 200 plays the video in the area 218. The drawn shape may be presented above or on top of the video in the area 218. Optionally, the shape may be drawn in a layer separate from a layer that presents the video such that the drawn shape does not modify frames of the video. The shape can be nontransparent (such that the video is fully obscured in the portion of the area 218 where the shape is drawn), fully transparent (such that the viewer cannot see the shape being drawn and the video is not obscured), or any transparency level in-between. Thus, if the shape has a transparency level less than fully nontransparent and greater than fully transparent, then the drawn shape may partially obscure the video.

The viewer can draw a shape by drawing a border. The viewer can draw a border of a shape by pressing down on the screen of a viewer device (e.g., with a finger or stylus) and dragging from one position on the screen to another position on the screen. An initial point formed when the viewer presses down on the screen may be a circle, square, or other type of polygon, and this initial point may be repeated for each position covered by the viewer when the viewer drags from one position on the screen to another position on the screen. Thus, the border of a drawn shape may comprise a series of points formed from pressing down and dragging on the screen. If the viewer forms a closed shape (e.g., the viewer presses down at an initial position on the screen and drags to different positions on the screen before coming to and releasing at the initial position on the screen), the portion of the area 218 that falls within the border of the shape may remain transparent, as shown in FIG. 2A with respect to shape 220. Alternatively, if the viewer forms a closed shape, the portion of the area 218 that falls within the border of the shape may acquire the same color, texture, transparency level, and/or the like of the drawn shape border.

It should be appreciated that the shape 220 can be drawn anywhere in the user interface 200 and in any particular size. For example, the shape 220 can be drawn to overlap with post bar 202 or drawn to be fully comprised within post bar 202 and still be detected and processed correctly. Further, in some embodiments, the shape 220 appears on the screen for a preconfigured or viewer-adjustable amount of time with a preconfigured or viewer-adjustable color, texture, line thickness, and/or transparency level. Once a viewer input is received (e.g., a shape drawn by a viewer), the app 130 can transmit information related to the input (e.g., x-y coordinates of the drawn shape, shape appearance data associated with the drawn shape, a button selected by a viewer to indicate a sentiment, a portion of the video associated with the drawn shape, etc.) to a sentiment analysis system 600 (a flow of which is described with respect to FIG. 6A in more detail below) for analysis. The app 130 may cause the shape 220 to then disappear from the use interface 200 after the preconfigured or viewer-adjustable amount of time. Also, viewer count 224 displays an indication that only 1 viewer is connected and viewing. However, any number of viewers can view the video at any given time.

Figure 2B:
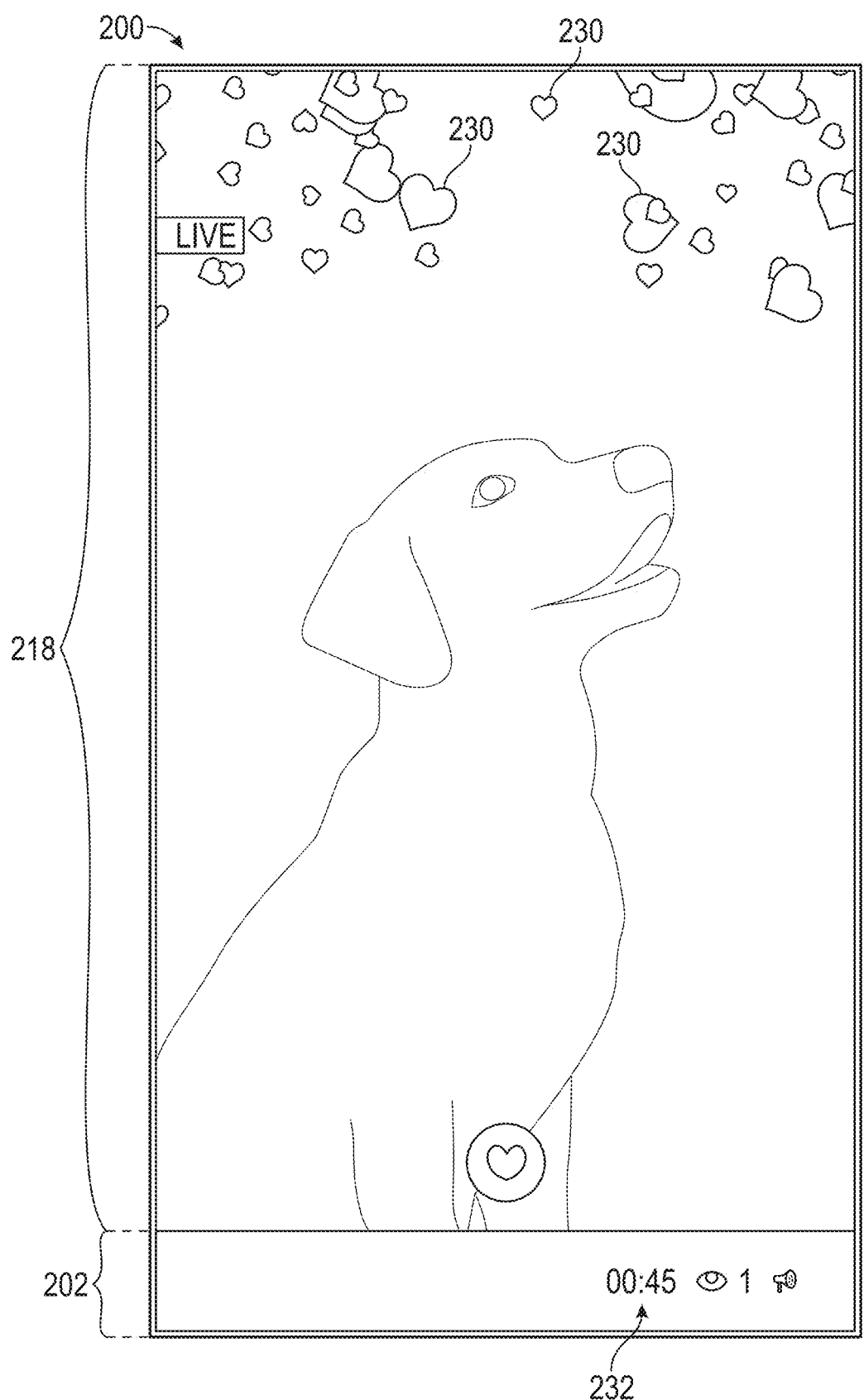
FIG. 2B depicts the example user interface of FIG. 2A, depicting a result of the interaction with the user interface.

FIG. 2B depicts the example user interface 200 of FIG. 2A, depicting a result of the interaction with the user interface 200. Once the sentiment analysis system 600 receives the input from the app 130, such as the input entered as illustrated in FIG. 2A, the sentiment analysis system 600 determines a sentiment and a confidence level of the sentiment. The sentiment analysis system 600 can determine the sentiment using the techniques described above. The sentiment analysis system 600 may then wait for a preconfigured or broadcaster-adjustable amount of time to receive additional inputs from other interactive devices 604, devices 120, and/or computing devices 104. Once the preconfigured or broadcaster-adjustable time has passed, or at the end of a particular time interval, the sentiment analysis system 600 can determine the overall sentiment for some or all viewers that indicated a sentiment. The sentiment analysis system 600 can determine the overall sentiment for some or all viewers by aggregating the sentiments determined from inputs received in response to individual viewers drawing shapes or otherwise indicating a sentiment.

If the determined overall sentiment is associated with a confidence level higher than a predetermined threshold, then the sentiment analysis system 600 transmits display instructions to the interacting device 604 (and/or the device 120 and/or the computing device 104) for how to display an animation or image corresponding to the determined overall sentiment. For example, an animation or image 230 can be presented in the area 218 corresponding to the determined overall sentiment resulting from the shape drawn in FIG. 2A. As illustrated in FIG. 2B, the determined overall sentiment matches the sentiment associated with the shape 220 drawn in FIG. 2A (e.g., the viewer's sentiment). However, the determined overall sentiment may not always match the sentiment associated with the shape 220 drawn in FIG. 2A. For example, the viewer that draws the shape 220 may not express a sentiment that is experienced by a majority or a plurality of viewers watching a corresponding portion of the video. Thus, the animation or image 230 presented in the area 218 may not necessarily correspond to the shape previously drawn in the area 218.

The sentiment analysis system 600 can modify the video to include the animation or image 230. For example, the sentiment analysis system 600 can modify one or more frames of the video to each include the contents of a frame of the animation or image 230. The contents of a frame of the animation or image 230 can overlay the content of the frame of a video such that the animation or image 230 is visible. The animation or image 230 can be partially transparent so that the entire video is not obscured. Alternatively, the sentiment analysis system 600 can merely direct the app 130 to overlay the animation or image 230 over one or more frames of the video, such as in a layer separate from the layer that presents the video (e.g., a layer on top of or above the layer that presents the video).

Additionally, time 232 illustrates that at least 1 second passed from the entry of shape 220 in FIG. 2A to the display of the animation or image 230 in FIG. 2B. In some embodiments, the time can be programmed such that a time that passes between entry of the shape 220 and display of the animation or image 230 is greater than or less than 1 second, or as short as possible (e.g., where the shortness of the delay may be limited by network throughput, device transmission speed, and/or network connection quality). It should be appreciated that although the sentiment is determined and displayed in FIG. 2B based on the input of only one viewer, if there are multiple viewers, the sentiment analysis system 600 causes display of an overall sentiment determined for some or all viewers, or some or all viewers that indicated a sentiment.

Figure 3A:
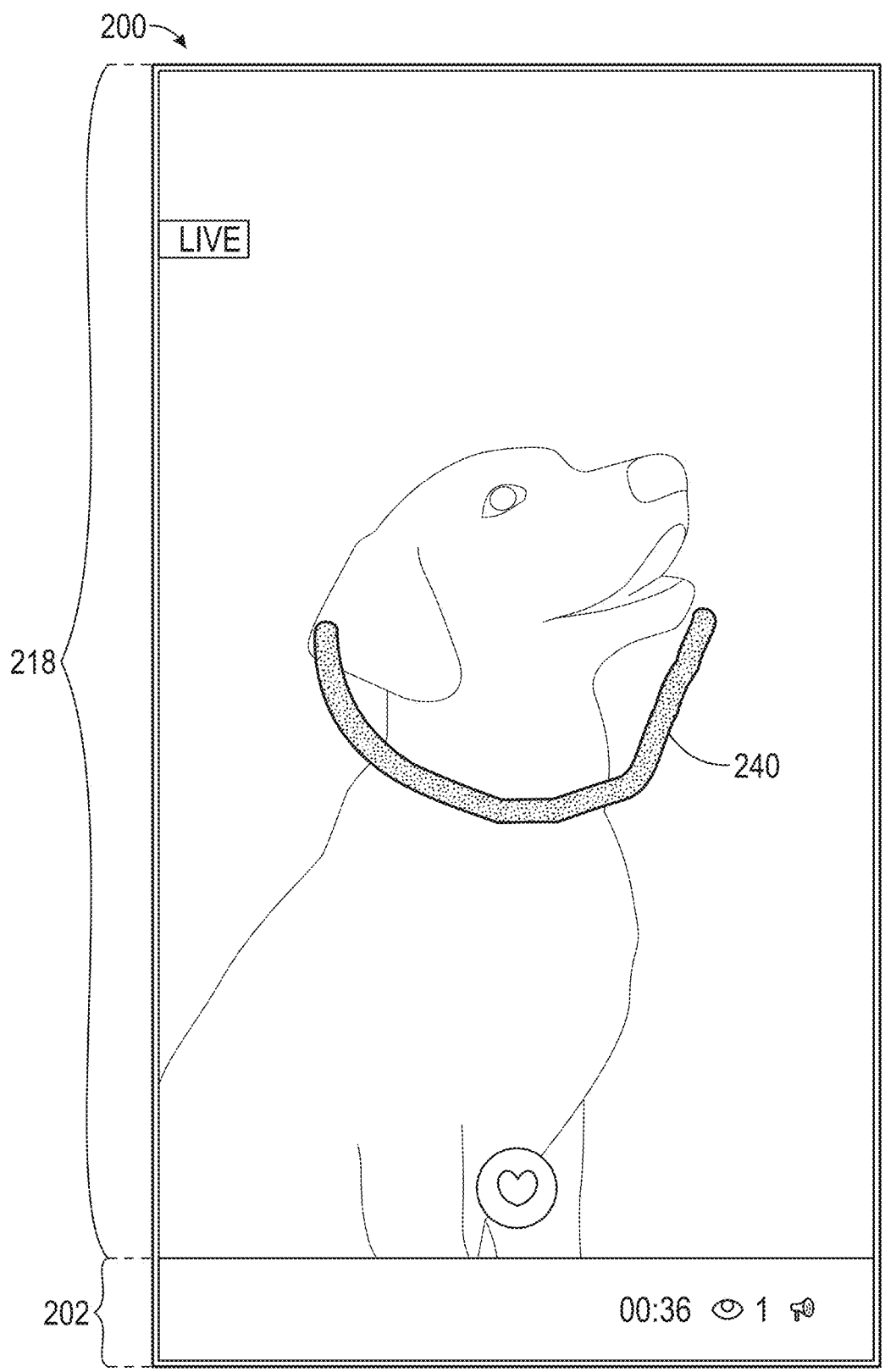
FIG. 3A depicts the example user interface of FIG. 1, depicting another example interaction with the user interface.

FIG. 3A depicts the example user interface 200 of FIG. 1, depicting another example interaction with the user interface 200 by an interactive device 604, a device 120, and/or a computing device 104. For example, a viewer can draw a shape 240, such as the lips or mouth of a smiley face, on the screen in area 218. The app 130 transmits the input to the sentiment analysis system 600 (the flow of which is described with respect to FIG. 6A in more detail below) for analysis, and the app 130 eventually causes the shape 240 to disappear from the user interface 200. Also, viewer count 224 displays an indication that only 1 viewer is connected and viewing the video.

In this example, since the viewer input only part of a smiley face, the sentiment analysis system 600 may determine that the shape 240 is most similar to a smiley face, but with a lower confidence rating than if the entire smiley face was drawn in the user interface 200. While a partial shape 240 is drawn, the sentiment analysis system 600 may nonetheless determine a sentiment and/or overall sentiment to improve user experience. For example, the shape 240 may have been drawn in one motion. Determining sentiment from this partial shape 240 drawn in one motion may be more convenient for a viewer because the viewer then does not necessarily have to input the entire smiley face, which would require multiple motions—lifting a finger or stylus up and down—to separately draw components of the complete smiley face figure (e.g., the mouth, eyes, nose, etc.).

Figure 3B:
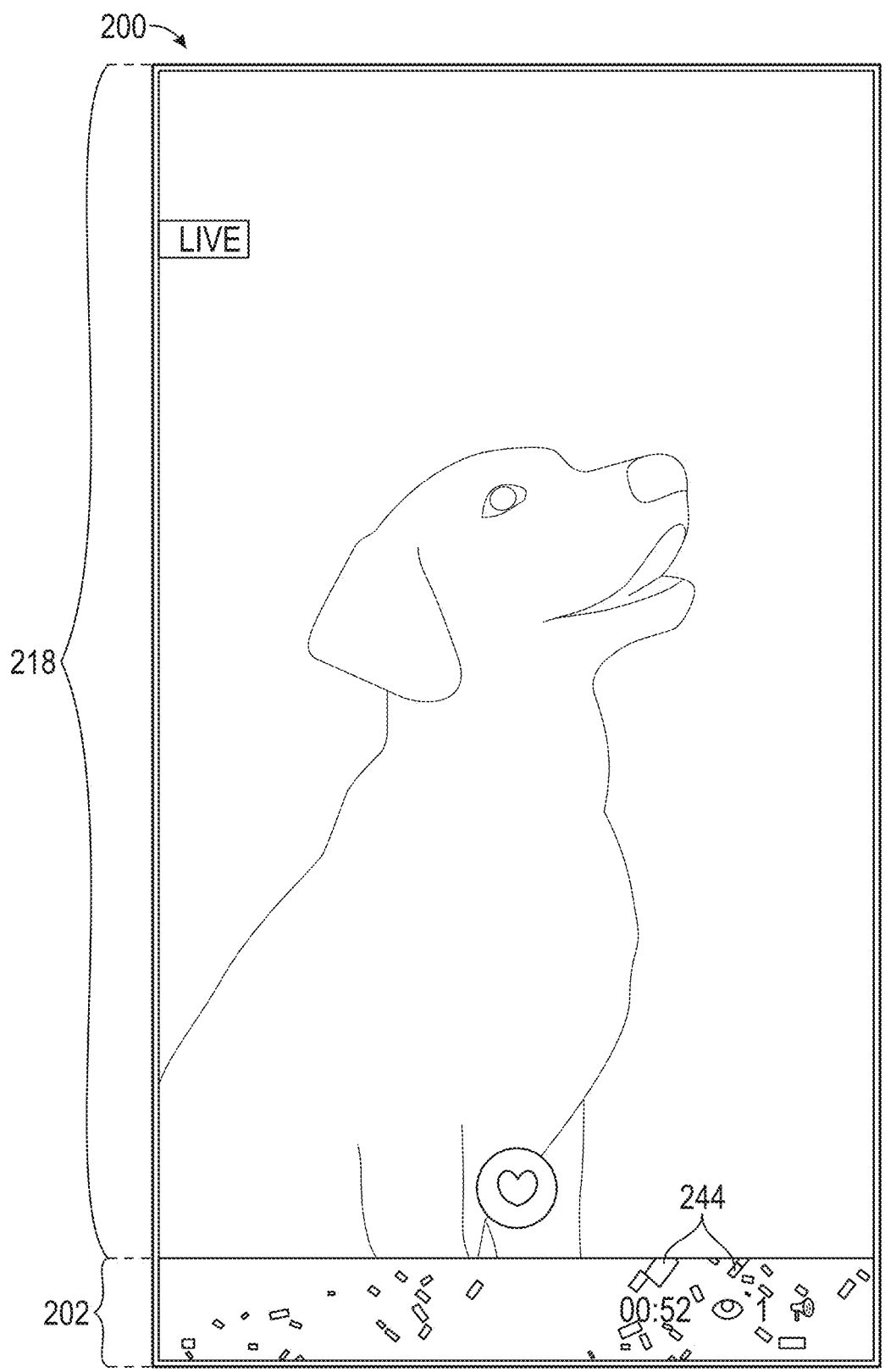
FIG. 3B depicts the example user interface of FIG. 3A, depicting a result of the interaction with the user interface.

FIG. 3B depicts the example user interface 200 of FIG. 3A, depicting a result of the interaction with the user interface. Once the sentiment analysis system 600 receives the input from the app 130, such as the input entered as illustrated in FIG. 3A, the sentiment analysis system 600 determines a sentiment and a confidence level of the sentiment. The sentiment analysis system 600 can determine the sentiment using the techniques described above.

If the determined sentiment is associated with a confidence level higher than a predetermined threshold, then the sentiment analysis system 600 transmits display instructions to the interacting device 604 (and/or the device 120 and/or the computing device 104) for how to display an animation or image corresponding to the determined sentiment. For example, an animation or image 244 can be presented in the post bar 202 corresponding to the determined sentiment resulting from the shape drawn in FIG. 3A.

In this example, the interactive device 604 (and/or the device 120 and/or the computing device 104) may display the animation or image 244 representing the particular viewer's sentiment in the post bar 202 so that the video in area 218 is not obstructed and so that the viewer can receive feedback whether the entered shape 240 was correctly received and processed by the sentiment analysis system 600. Here, the animation or image 244 is falling confetti, which is an animation or image that corresponds to the sentiment of happiness. Thus, the viewer receives feedback that the entered shape 240 (e.g., a smiley face corresponding to the sentiment of happiness) was correctly received and processed.

Figure 3C:
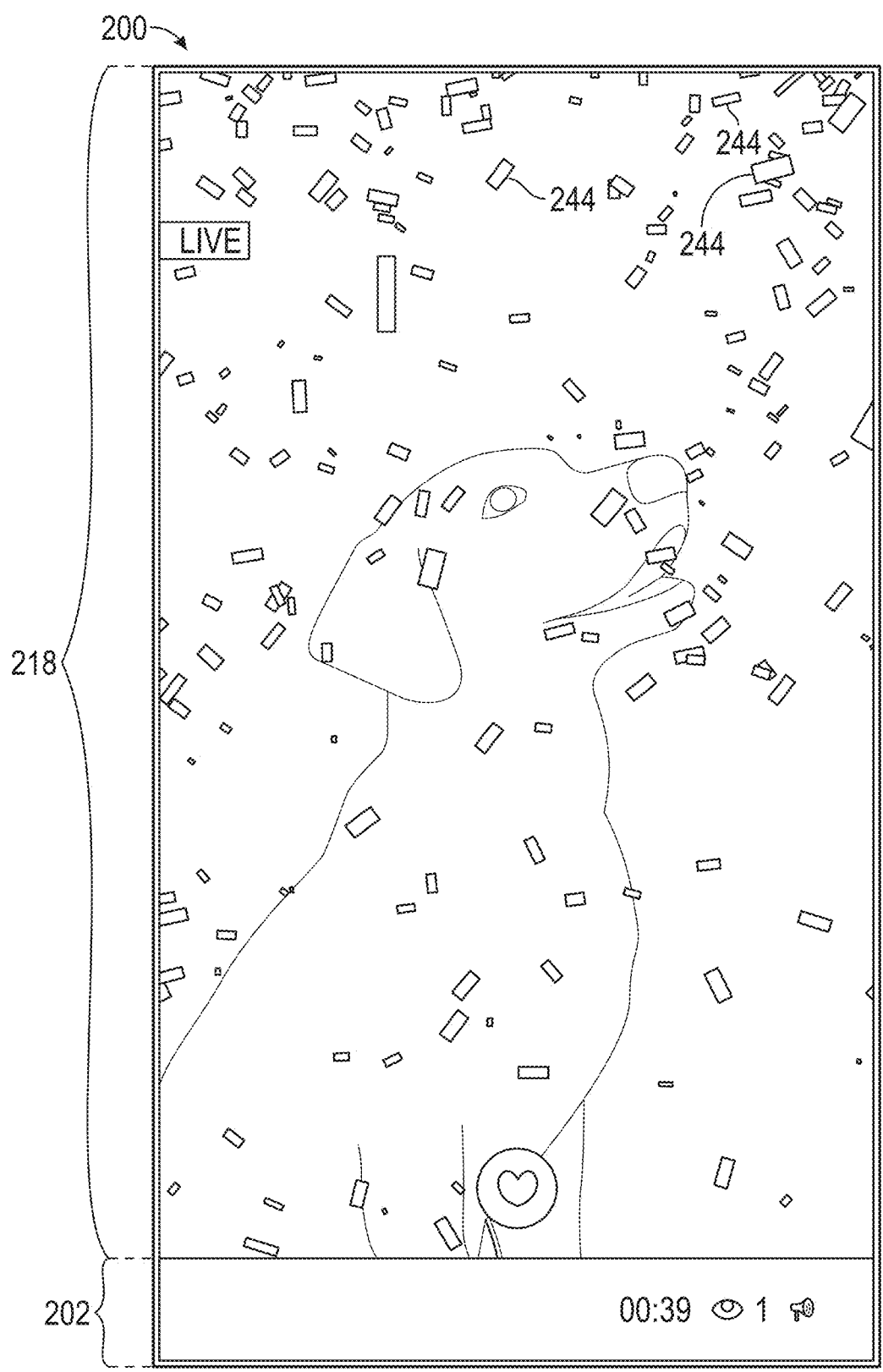
FIG. 3C depicts the example user interface of FIG. 3A, depicting another result of the interaction with the user interface.

FIG. 3C depicts the example user interface 200 of FIG. 3A, depicting another result of the interaction with the user interface 200. Once the sentiment analysis system 600 receives the input from the app 130, such as the input entered as illustrated in FIG. 3A, the sentiment analysis system 600 determines a sentiment and a confidence level of the sentiment. The sentiment analysis system 600 may then wait for a preconfigured or broadcaster-adjustable amount of time to receive additional inputs from other interactive devices 604, the devices 120, and/or the computing devices 104. Once the preconfigured or broadcaster-adjustable time has passed, or at the end of a particular time interval, the sentiment analysis system 600 can determine the overall sentiment for some or all viewers that indicated a sentiment. The sentiment analysis system 600 can determine the overall sentiment for some or all viewers by aggregating the sentiments determined from inputs received in response to individual viewers drawing shapes or otherwise indicating a sentiment.

If the determined overall sentiment is associated with a confidence level higher than a predetermined threshold then the sentiment analysis system 600 transmits display instructions to the interacting device 604 (and/or the device 120 and/or the computing device 104) for how to display an animation or image corresponding to the determined overall sentiment. In this example, the interactive device 604 and non-interacting devices 606 (and/or the device 120 and/or the computing device 104) may display the animation or image 244 representing the overall sentiment in the area 218.

It should be appreciated that in some embodiments, the overall sentiment can match the viewer's sentiment (e.g., both are determined to be "happy"), and that a viewer entering a particular sentiment shape (e.g., a smiley face) may see an animation 244 in the post bar 202 to indicate a successful entry of the input, and then soon thereafter see the animation 244 in the display area 218 to indicate the overall sentiment of all viewers. In some embodiments, however, a viewer may only see an animation 244 in the post bar 202 if the viewer's sentiment matches the overall sentiment (e.g., no further animation or image is displayed, such as in the area 218). It should also be appreciated that a non-interactive device 606 may also be an interactive device 604 if the viewer associated with the non-interactive device 606 provides an input.

Figure 4A:
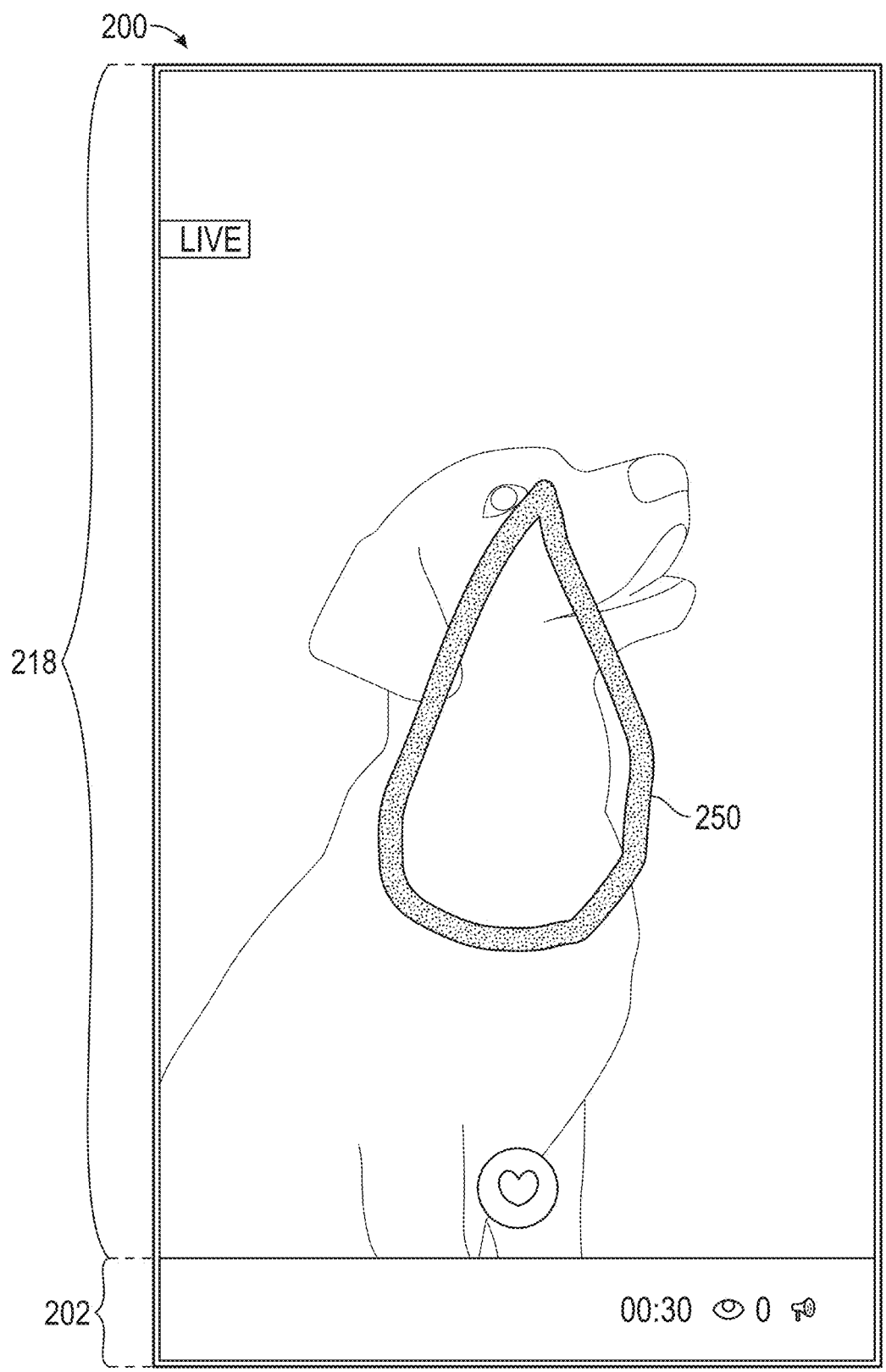
FIG. 4A depicts the example user interface of FIG. 1, depicting another example interaction with the user interface.

FIG. 4A depicts the example user interface 200 of FIG. 1, depicting another example interaction with the user interface 200 by an interacting device 604, a device 120, and/or a computing device 104. For example, a viewer can draw a shape 250, such as a tear drop, on the screen in area 218. The app 130 transmits the input to the sentiment analysis system 600 (the flow of which is described with respect to FIG. 6A in more detail below) for analysis, and the app 130 eventually causes the shape 250 to disappear from the user interface 200.

Figure 4B:
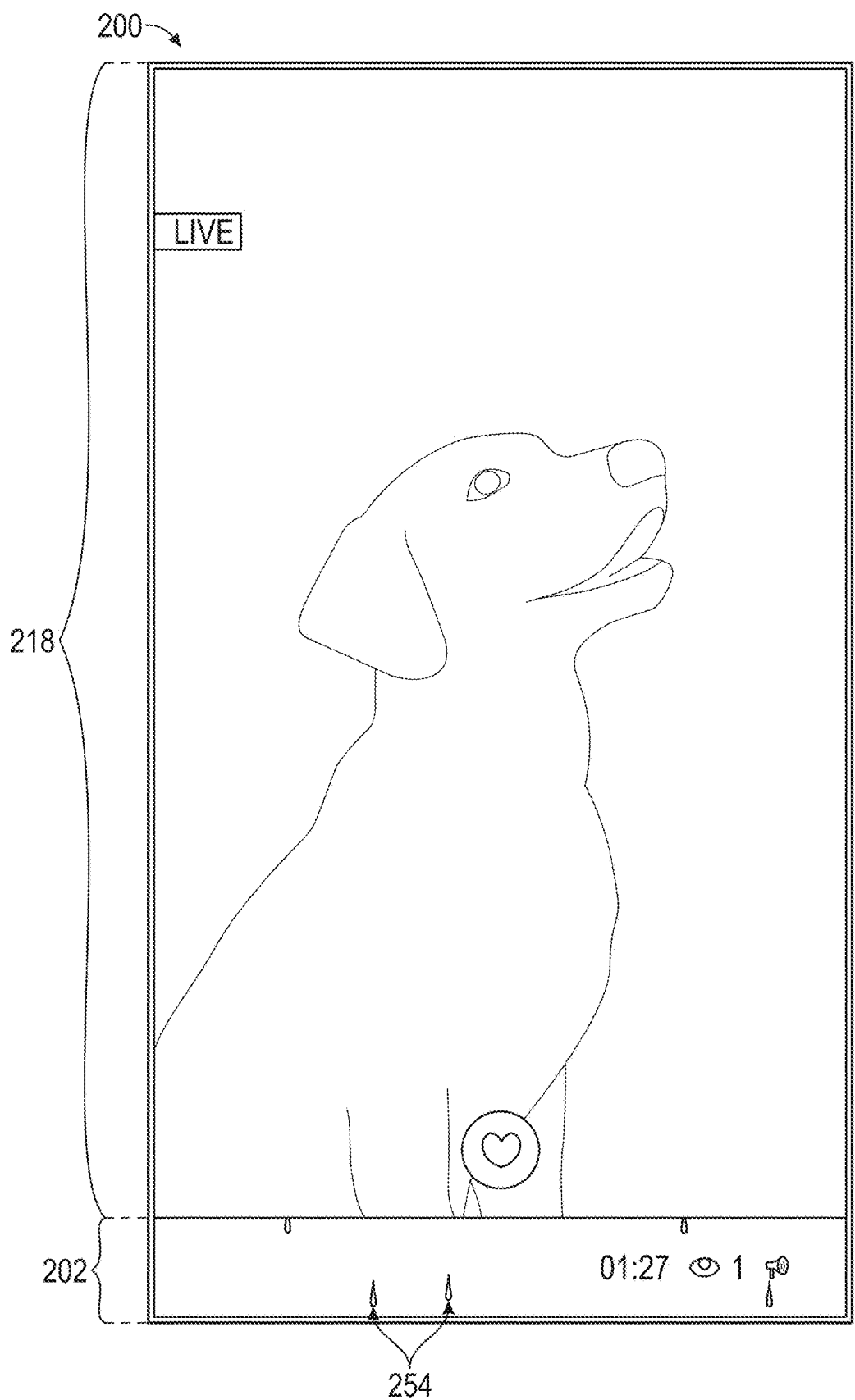
FIG. 4B depicts the example user interface of FIG. 4A, depicting a result of the interaction with the user interface.

FIG. 4B depicts the example user interface 200 of FIG. 4A, depicting a result of the interaction with the user interface 200. Once the sentiment analysis system 600 receives the input from the app 130, such as the input entered as illustrated in FIG. 4A, the sentiment analysis system 600 determines a sentiment and a confidence level of the sentiment. The sentiment analysis system 600 can determine the sentiment using the techniques described above.

If the determined sentiment is associated with a confidence level higher than a predetermined threshold then the sentiment analysis system 600 transmits display instructions to the interacting device 604 (and/or the device 120 and/or the computing device 104) for how to display an animation or image corresponding to the determined sentiment. For example, an animation or image 254 can be presented in the post bar 202 corresponding to the determined sentiment resulting from the shape drawn in FIG. 4A.

In this example, the interactive device 604 (and/or the device 120 and/or the computing device 104) may display the animation or image 254 representing the particular viewer's sentiment in the post bar 202 so that the video in area 218 is not obstructed and so that the viewer can receive feedback whether the entered shape 250 was correctly received and processed by the sentiment analysis system 600. Here, the animation or image 254 is falling tear drops, which is an animation or image that corresponds to the sentiment of sadness. Thus, the viewer receives feedback that the entered shape 250 (e.g., a tear drop corresponding to the sentiment of sadness) was correctly received and processed.

Figure 4C:
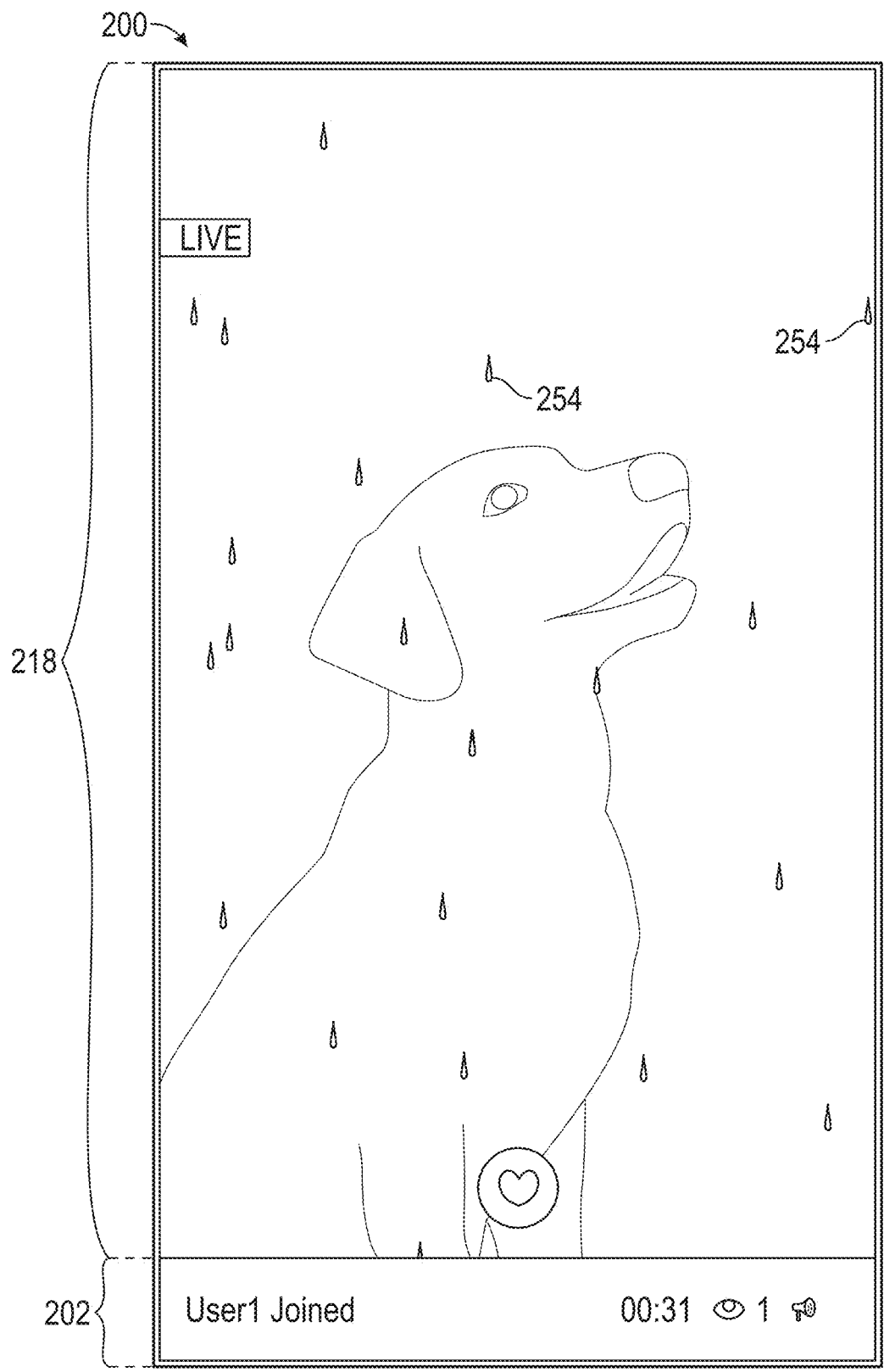
FIG. 4C depicts the example user interface of FIG. 4A, depicting another result of the interaction with the user interface.

FIG. 4C depicts the example user interface 200 of FIG. 4A, depicting another result of the interaction with the user interface 200. Once the sentiment analysis system 600 receives the input from the app 130, such as the input entered as illustrated in FIG. 4A, the sentiment analysis system 600 determines a sentiment and a confidence level of the sentiment. The sentiment analysis system 600 may then wait for a preconfigured or broadcaster-adjustable amount of time to receive additional inputs from other interactive devices 604, the devices 120, and/or the computing devices 104. Once the preconfigured or broadcaster-adjustable time has passed, or at the end of a particular time interval, the sentiment analysis system 600 can determine the overall sentiment for some or all viewers that indicated a sentiment. The sentiment analysis system 600 can determine the overall sentiment for some or all viewers by aggregating the sentiments determined from inputs received in response to individual viewers drawing shapes or otherwise indicating a sentiment.

If the determined overall sentiment is associated with a confidence level higher than a predetermined threshold then the sentiment analysis system 600 transmits display instructions to the interacting device 604 (and/or the device 120 and/or the computing device 104) for how to display an animation or image corresponding to the determined overall sentiment. In this example, the interactive device 604 and non-interacting devices 606 (and/or the device 120 and/or the computing device 104) may display the animation or image 254 representing the overall sentiment in the area 218.

Other Features of the App

The app 130 can also provide viewer-based statistics associated with a video stream. The viewer-based statistics can include top fans, viewers, and promoters. The top fans can be denoted by the viewers who have top tipping amounts. The top viewers can be determined based on the interactions that the viewers have taken with respect to the video stream. For example, top viewers may be determined based on the number of sentiment expressions, comments written, or gifts given, alone or in combination. The top promoters may include those who have made a large number of referrals of the video stream. The viewer-based statistics can be calculated during and/or after the live or taped video broadcast. For example, the top viewer statistic may take into account those people who watch the video stream after the live or taped broadcast, but yet made a large number of sentiment expressions while watching. The viewer-based statistics may be available to the broadcaster (e.g., a user of the computing device 104 and/or the transmitting device(s) 602), other users of the app 130 (e.g., users of the device 120, the interacting devices 604, and/or the non-interacting devices 606), alone or in combination.

The app 130 can also allow a viewer to tip a broadcaster. For example, the viewer can send an amount of tokens (which may be coins) via the app 130 while the viewer is watching a live or taped stream. Advantageously, in some embodiments, to improve user experience, the app 130 can provide a quick tipping feature which allows a user to automatically send set amount of tokens to the broadcaster, without needing to specify the exact amount of tip. For example, a user can tap a user interface icon (which may be shaped as a token) of the streaming app, and the streaming app can automatically tip 2 tokens to the broadcaster. In certain implementations, the user can increase the amount of tips by continuously pressing the user interface icon. The user can also confirm the amount of tips by moving the user interface icon into a predefined location. The user can also cancel the amount of tips by a hand gesture. For example, the user may continuously press the token shaped icon until the tip amount reaches 10 tokens. The user can move the token shaped icon into a circle in the middle of the user interface screen and release the icon to confirm the tip amount. The user can also move the token shaped icon down from the circle or release the finger without dragging the icon into the circle to cancel the tip amount. As a result of such a cancellation action, the 10 tokens may not be sent to the broadcaster.

The app 130 can provide a chat system that allows viewers to make comments on a live or taped stream. The chat system can provide real-time chat replay for a broadcaster or a viewer. Advantageously, in some embodiments, the app 130 can be implemented such that the user does not have to scroll (or otherwise move) the screen to view the previous chat (which may cause the content of the live stream or a portion of the content to be moved outside of the screen). In certain implementations, the app 130 can be implemented in a stateful programming language, such that the user does not have to navigate the whole frame (for example, like JavaScript) in order to switch between the comments and the video. The comments and video can be implemented as two separate objects. The two objects can be located at different locations of a display (for example, video being located in the center of the display whereas the chat system being located at the right or left side of the display). Thus, the movements of one (for example, scrolling the comments) cannot affect the movement of the other (for example, changing the location of the video).

Advantageously, in some embodiments, the chat system can track the threads of conversations and break conversations among viewers (and the broadcaster) into different threads. For example, one thread may include discussions of the location of the broadcast and another thread may include discussions on the broadcaster. As a result, the comments can be presented in a linear fashion (for example, comments in the same thread can be presented together). In certain implementations, the app 130 can allow a broadcaster to send targeted messages to certain groups of users, such as its followers, top viewers, top promoters, etc. As an example, the broadcaster can send targeted messages to followers who promoted a certain video of the broadcaster. The broadcaster can also send individual messages to patrons in bulk.

Example Computing Environment

Figure 5:
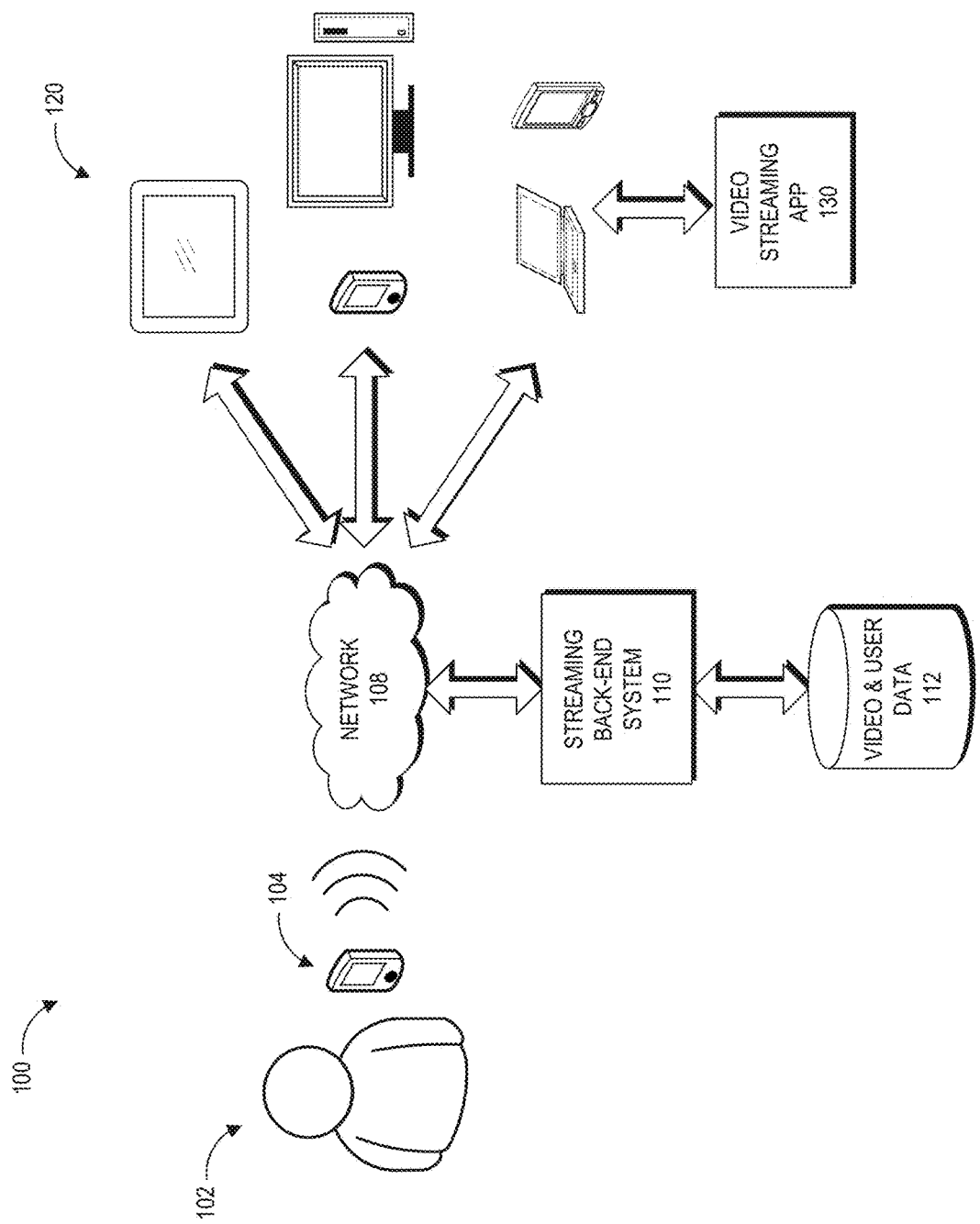
FIG. 5 depicts an example computing environment for a live video streaming system.

Referring to FIG. 5, an example computing environment 100 is shown that represents a system for streaming live or taped videos and accessing those streams. As shown, a streaming user 102 streams video using a computing device 104. The computing device 104 may include a camera that can capture live video of the streaming user 102 (or "streamer" 102 or viewer 102) or whatever the user 102 is interested in capturing. The computing device 104 may be any device with a processor, such as (but not limited to) a smart phone, cell phone, tablet, phablet, laptop, television, or desktop computer. An application (not shown) installed on the computing device 104 can capture video obtained from the camera of the computing device 104 and transmit the video in real-time or near real-time to a network 108. The network 108 can be a local area network (LAN), a wide area network (WAN), the public Internet, a private intranet, combinations of the same, or the like. The computing device 104 can optionally process or edit the video prior to transmission of the processed or edited video over the network 108.

The video can be transmitted over the network 108 to devices 120. Each device 120 may be any device with a processor, such as but not limited to a smart phone, cell phone, tablet, phablet, laptop, television, or desktop computer. Each device 120 can have installed them on a video streaming app 130. The app 130 installed on the devices 120 can be the same app or a different app that is installed on the streamer's 102 device 104. Using the video streaming app 130, users of the devices 120 can access the live or taped video stream output by the streamer's 102 computing device 104. The devices 120 can also be referred to as interacting devices 604 or non-interacting devices 606.

An example streaming back-end system 110 is also shown in communication with the network 108. This back-end system 110 can manage various features associated with the video streaming app 130 installed on the devices 120 as well as the corresponding app installed on the streamer's 102 device 104. The back-end system 110 can also perform some or all of the operations described herein as being performed by the sentiment analysis system 600. The back-end system 110 can include one or more physical and/or virtual servers, which may be physically co-located or geographically dispersed, for example, in one or more data centers. The back-end system 110 may be implemented in a cloud computing platform or in a content delivery network (CDN). The back-end system 110 communicates with physical computer data storage 112 in the depicted embodiment. This data storage 112 can store videos captured by users as well as store user data.

The video streaming app 130 may be a mobile application, a web application, or a combination of the same. In one embodiment, the video streaming app 130 is a mobile application that may be downloaded from an application store, such as the Apple App Store™ for the Google Play™ application store. In another embodiment, the video streaming app 130 is accessed in a browser installed as another application on the user computing device 120. For example, users can access one or more uniform resource locators (URLs) with the browser to access the features of the video streaming app 130 from one or more websites.

In certain embodiments, the video streaming app 130 can include any subset of the following features. The video streaming app 130 can provide comment promotion by the streamer 102 to keep new audience members informed of what's going on. The app 130 can also provide viewer engagement bars, such as a bar at the top of the view or bottom of the view which provides the ability for users and streamers 102 to gauge interest based on viewers' likes. The app 130 can also facilitate monetization by showing the streamer 102 how many tokens are earned by the stream. The app 130 can also provide in-app analytics, such as current viewers, drop-offs, money earned, likes, and chats. The app 130 can also retain videos for re-watching later (for example, by storing those videos in the data store 112). The app 130 can also include a Live Stream Preview, which can give a viewer a peek into a paid stream.

In addition, the video streaming app 130 may also include any subset of the following features. For example, the app 130 can also include subscriptions which can grant users access to some or all streams from one streamer. The app 130 can further include token Analytics, which can show streamers 102 how much money they have made in one easy view. The app 130 can also measure a retention rate, which can include how many people are watching a stream vs. dropping off of a stream. The app 130 can also enable an unlimited audience for free or paid streams. The app 130 can also enable users 102 to easily discover videos through tags and searching. The app 130 can also provide distraction-free viewing. For example, some or all controls may be off of the screen while watching a video. The app 130 can also enable users 102 to swipe left/right or up/down to view more information. The app 130 can also allow users 102 to schedule an upcoming live event. Streamers 102 can set a price per stream using the app 130. The app 130 can also provide VIP Access (for example, all videos from a streamer) or Premium Access (for example, one video at a time). The app 130 can also be used in landscape and portrait modes.

In certain implementations, the app 130 can include a section which can continuously play at least a portion of one or more videos. For example, the first page of the app 130 can continuously play a recommended video to attract viewers. As another example, the app 130 can provide a feature banner which can include a portion of a live stream video. The feature banner can provide a user an opportunity to preview the live stream content before joining the live stream. The video can be continuously played without sound. If a user clicks on the video that's continuously being played, the app 130 can bring the sound back.

The app 130 can include a profile view. The profile view can include a playlist. Whenever someone promotes a stream, the stream can be added to the playlist. The playlist can include a list of videos which a user broadcasts and earns tokens. If someone purchases an item on the playlist, the user can earn tokens from the purchase.

In certain implementations, the app 130 may automatically provide an introductory video to a new user when the user first opens the app 130. Once the user views the introductory video, the introductory video can automatically disappear.

The app 130 can also allow viewers to input indications of sentiments experienced while watching a video. The app 130 can also display to viewers an indication of an overall sentiment experienced by a plurality of viewers.

Although the examples of the app 130 are described with reference to broadcasting videos, in certain embodiments, the various functions of the app 130 can also be applicable to images or audio (for example, audio without any video). For example, the app 130 can be configured for a user to share images or audio with other users of the app 130.

Example Flow Chart of the System

Figure 6A:
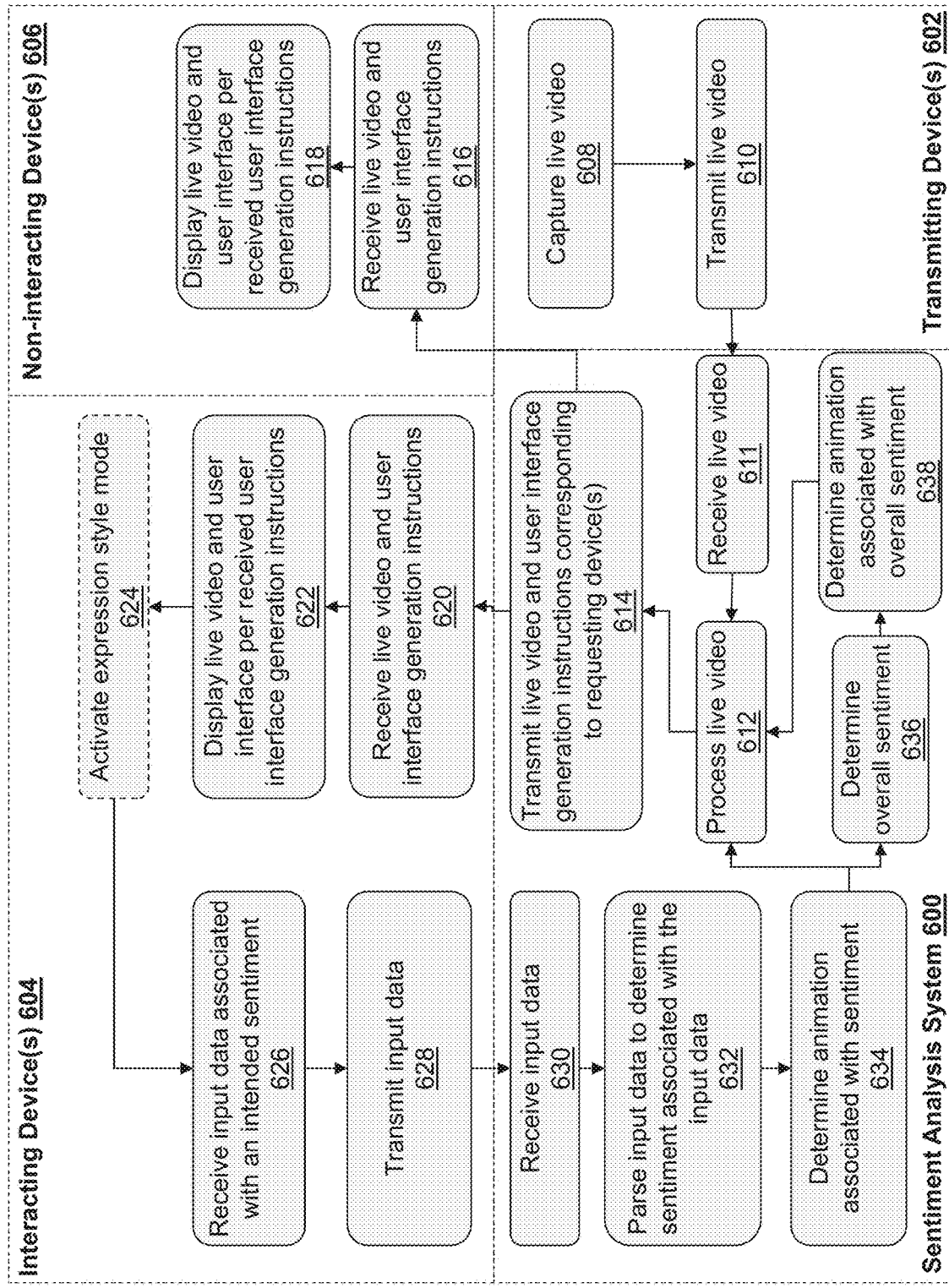
FIG. 6A depicts an example flowchart of a process for receiving an input, determining user sentiment, and displaying animations based on the determined sentiment.

FIG. 6A depicts an example flowchart of a process for receiving an input, determining user sentiment, and displaying animations based on the determined sentiment, according to various embodiments of the present disclosure. More specifically, FIG. 6A illustrates a flow chart diagram illustrating the functionality of an example sentiment analysis system 600, interacting device(s) 604, non-interacting device(s) 606, and transmitting device(s) 602, and how the devices/systems communicate and interact to generate an overall sentiment for display. In some embodiments, the sentiment analysis system 600, the interacting device(s) 604, the non-interacting device(s) 606, and/or the transmitting device(s) 602 can communicate via the network 108. While not shown, the sentiment analysis system 600, the interacting device(s) 604, the non-interacting device(s) 606, and/or the transmitting device(s) 602 can be present in the example computing environment 100 of FIG. 5.

The sentiment analysis system 600 can be a standalone system in the example computing environment 100 of FIG. 5, communicating with the device(s) 120, the computing device(s) 104, the streaming back-end system 110, the interacting device(s) 604, the non-interacting device(s) 606, and/or the transmitting device(s) 602 via the network 108. The sentiment analysis system 600 can include one or more physical and/or virtual servers, which may be physically co-located or geographically dispersed, for example, in one or more data centers. The sentiment analysis system 600 may be implemented in a cloud computing platform or in a CDN. Alternatively, the functionality of the sentiment analysis system 600 can be performed by the streaming back-end system 110.

Similarly, the interacting device(s) 604, the non-interacting device(s) 606, and/or the transmitting device(s) 602 can be standalone devices present in the example computing environment 100 of FIG. 5. For example, each of the interacting device(s) 604, the non-interacting device(s) 606, and/or the transmitting device(s) 602 may be any device with a processor, such as but not limited to a smart phone, cell phone, tablet, phablet, laptop, television, or desktop computer. Some or all of the interacting device(s) 604 and non-interacting device(s) 606 can have installed them on the video streaming app 130 or a version of the app 130 that includes some, but not all, of the functionality described herein. For example, the app 130 installed on the non-interacting device(s) 606 may not have functionality that allows a viewer to draw a shape in the user interface or to otherwise indicate a sentiment. Rather, the app 130 installed on the non-interacting device(s) 606 may simply allow the viewer to watch a video stream and view indications of overall sentiments and other related data. An application (not shown) installed on the transmitting device(s) 602 can capture video obtained from the camera of the transmitting device(s) 602 and transmit the video in real-time or near real-time to the network 108. The transmitting device(s) 602 can optionally process or edit the video prior to transmission of the processed or edited video over the network 108. The app 130 installed on the interacting device(s) 604 and/or the non-interacting device(s) 606 can be the same app or a different app that is installed on the transmitting device(s) 602. Alternatively, instead of being standalone devices, the transmitting device(s) 602 can be the same as the computing device(s) 104, and the interacting device(s) 604 and/or the non-interacting device(s) 606 can be the same as the device(s) 120.

Depending on the embodiment, the method of FIG. 6A may include fewer or additional blocks and the blocks may be performed in an order that is different than illustrated. Thus, the blocks of FIG. 6A should be interpreted to be acceptable in no particular order, except where the system or method would not function for its intended purpose. One or more of the blocks described may be optional in certain implementations. Additionally, the discussion below and herein describes features associated with a sentiment analysis system 600 and features associated with one or more interacting device(s) 604, non-interacting device(s) 606, and transmitting device(s) 602, as well as any other system used to assist in implementing or enhancing the features described herein. In some embodiments, the sentiment analysis system 600 can encompass some or all of the features of the interacting device(s) 604, non-interacting device(s) 606, and transmitting device(s) 602, and interacting device(s) 604, non-interacting device(s) 606, and transmitting device(s) 602 may be the same device or devices. In some embodiments, while certain blocks are shown as being performed by the interacting device(s) 604, non-interacting device(s) 606, and transmitting device(s) 602, and interacting device(s) 604, in other embodiments, those block(s) can be performed by the sentiment analysis system 600, such as receiving certain user input or causing presentation of an animation or image, or vice versa, or by other computing systems or components.

In block 608, a transmitting device 602 can capture live video, and in block 610 the transmitting device 602 can transmit the video in substantially real-time to the sentiment analysis system 600, where transmission may be considered to occur in "real-time" or "substantially real-time" if, for example, the delay between video capture and transmission is sufficiently short (e.g., less than a few seconds). The transmission speed can be based on the type of connection (e.g. cellular, WI-FI, Bluetooth, or the like), the available data throughput, and/or the connection quality.

In block 611, the sentiment analysis system 600 receives the live video from the transmitting device 602. In block 612, the sentiment analysis system 600 processes the live video and creates instructions for displaying the video and user interfaces, such as the user interface 200. In block 614, the sentiment analysis system 600 transmits the processed live video and instructions for displaying the video and user interfaces to the non-interacting device(s) 606 and interacting device(s) 604. The sentiment analysis system 600 can transmit the processed live video to the non-interacting device(s) 606 and/or interacting device(s) 604 that request access to the video.

In block 616, the non-interacting device(s) 606 receive the processed live video and instructions for displaying the video and user interfaces from the sentiment analysis system 600. As a result, the non-interacting device(s) 606 can each generate user interface data based on the instructions that, when executed, cause the non-interacting device(s) 606 to render and display a user interface that plays the video, such as the user interface 200. Alternatively, the instructions created by the sentiment analysis system 600 comprise the user interface data. Thus, the non-interacting device(s) 606 can simply execute the instructions (e.g., the user interface data) to render and display the user interface that plays the video. In block 618, the non-interacting device(s) 606 can display the live video and user interface per the received instructions.

In block 620, the interacting device(s) 604 receive the processed live video and instructions for displaying the video and user interfaces from the sentiment analysis system 600. As a result, the interacting device(s) 604 can each generate user interface data based on the instructions that, when executed, cause the interacting device(s) 604 to render and display a user interface that plays the video, such as the user interface 200. Alternatively, the instructions created by the sentiment analysis system 600 comprise the user interface data. Thus, the interacting device(s) 604 can simply execute the instructions (e.g., the user interface data) to render and display the user interface that plays the video. In block 622, the interacting device(s) 604 can display the live video and user interface per the received instructions.

Optionally, in block 624, an expression style mode can be activated or enabled on the interacting device(s) 604. For example, a viewer may not be able to enter a gesture or shape until activating the expression style mode. In some embodiments, the expression style mode is automatically activated on the interacting device(s) 604 when a video stream starts to or is in the process of playing on the interacting device(s) 604.

In block 626, the interacting device(s) 604 can receive input data associated with an intended sentiment. For example, the input data can be generated as a result of a viewer drawing a shape in the displayed user interface or otherwise performing an action to indicate a sentiment. In block 628, the interacting device(s) 604 can transmit the input data to the sentiment analysis system 600.

In block 630, the sentiment analysis system 600 receives the input data from the interacting device(s) 604, and in block 632, the sentiment analysis system 600 parses the input data to determine a sentiment associated with the input data with a corresponding confidence rating or level. For example, the input data can include coordinates of a drawn shape, and the sentiment analysis system 600 can compare the drawn shape to known shapes that are each associated with a sentiment and/or provide the input data (e.g., the shape coordinates) as an input to an AI model trained to output a perceived sentiment and corresponding confidence level. If comparing the drawn shape to known shapes, the sentiment analysis system 600 can determine that a drawn shape matches or nearly matches a known shape if a difference between edges of the drawn shape and edges of the known shape are less than a threshold distance, if the angles of the edges of the drawn shape and the angles of the edges of the known shape are within a threshold angle, etc. If comparing the drawn shape to known shapes, the sentiment analysis system 600 can determine the corresponding confidence level based on how small the difference is between the edges of the drawn shape and the edges of the known shape, the angles of the edges of the drawn shape and the angles of the edges of the known shape, etc.

In block 634, the sentiment analysis system 600 determines an animation associated with the determined sentiment to overlay on the video. For example, the associated animation may be the animation associated with a known shape that matches the drawn shape and/or an animation associated with the perceived sentiment output by the trained AI model. In block 612 the live video is processed with the determined sentiment (e.g., the associated animation is overlaid on top of the live video, at least some frames of the live video are modified to each include a frame of the animation such that the animation plays as the live video plays on the interacting device(s) 604 and/or the non-interacting device(s) 606, etc.) and, from block 614, the sentiment analysis system 600 transmits the live video processed with the determined sentiment to the interacting device 604 that provided the input data so that the interacting device 604 displays the determined sentiment in the post bar 202 section of the user interface 200, for example, as shown in FIGS. 3B and 4B. Alternatively, the interacting device 604 that provided the input data can display the determined sentiment in the area 218 and/or in any other area of the user interface 200. By causing the interacting device 604 that provided the input data to display the determined sentiment, the viewer of the interactive device 604 receives feedback related to the input.

In block 636, after one or more interacting devices 604 transmit input data to the sentiment analysis system 600 from block 628 over a period of time, such as a specified time interval, the sentiment analysis system 600 determines the overall sentiment as described herein. For example, the sentiment analysis system 600 can aggregate the sentiments determined based on input data provided by one or more of the interacting devices 604 to identify which type of sentiment was most popular (e.g., which type of sentiment was indicated by a majority of viewers), which type of sentiment was indicated by a plurality of viewers, which type of sentiment was indicated by a threshold number of viewers, etc. The type of sentiment identified as being indicated by a majority of viewers, by a plurality of viewers, by a threshold number of viewers, etc. can be the determined overall sentiment. Once determined, in block 638, the sentiment analysis system 600 determines an animation associated with the overall sentiment. In block 612 the live video is processed with the determined overall sentiment (e.g., the associated animation is overlaid on top of the live video, at least some frames of the live video are modified to each include a frame of the animation such that the animation plays as the live video plays on the interacting device(s) 604 and/or the non-interacting device(s) 606, etc.) and, from block 614, the sentiment analysis system 600 transmits to the interacting device(s) 604 and/or the non-interacting device(s) 606 the live video processed with the determined sentiment so that the interacting device(s) 604 and/or non-interacting device(s) 606 display the overall sentiment in the area 218 of the user interface, for example, as shown in FIGS. 2B, 3C, and 4C. Alternatively, the interacting device(s) 604 and/or non-interacting device(s) 606 can display the determined overall sentiment in the post bar 202 and/or in any other area of the user interface 200. Once the overall sentiment is shown (e.g., with an animation), the animation can end (e.g., the interacting device(s) 604 and/or non-interacting device(s) 606 can cause the animation to disappear from view) and no overall sentiment indication may be displayed until the next sentiment or overall sentiment determination is made by the sentiment analysis system 600, which can occur at a regular time interval (as described above), once a certain number of indications of sentiment are received, or once a certain proportion of viewers of a video provide an indication of sentiment (e.g., more than 25%, 50%, 75%, or the like).

While FIG. 6A is described herein with respect to the transmission of live video, this is not meant to be limiting. For example, some or all of the operations described with respect to FIG. 6A can be performed to transmit taped video content to the interacting device(s) 604 and/or the non-interacting device(s) 606.

Example System Diagram

Figure 6B:
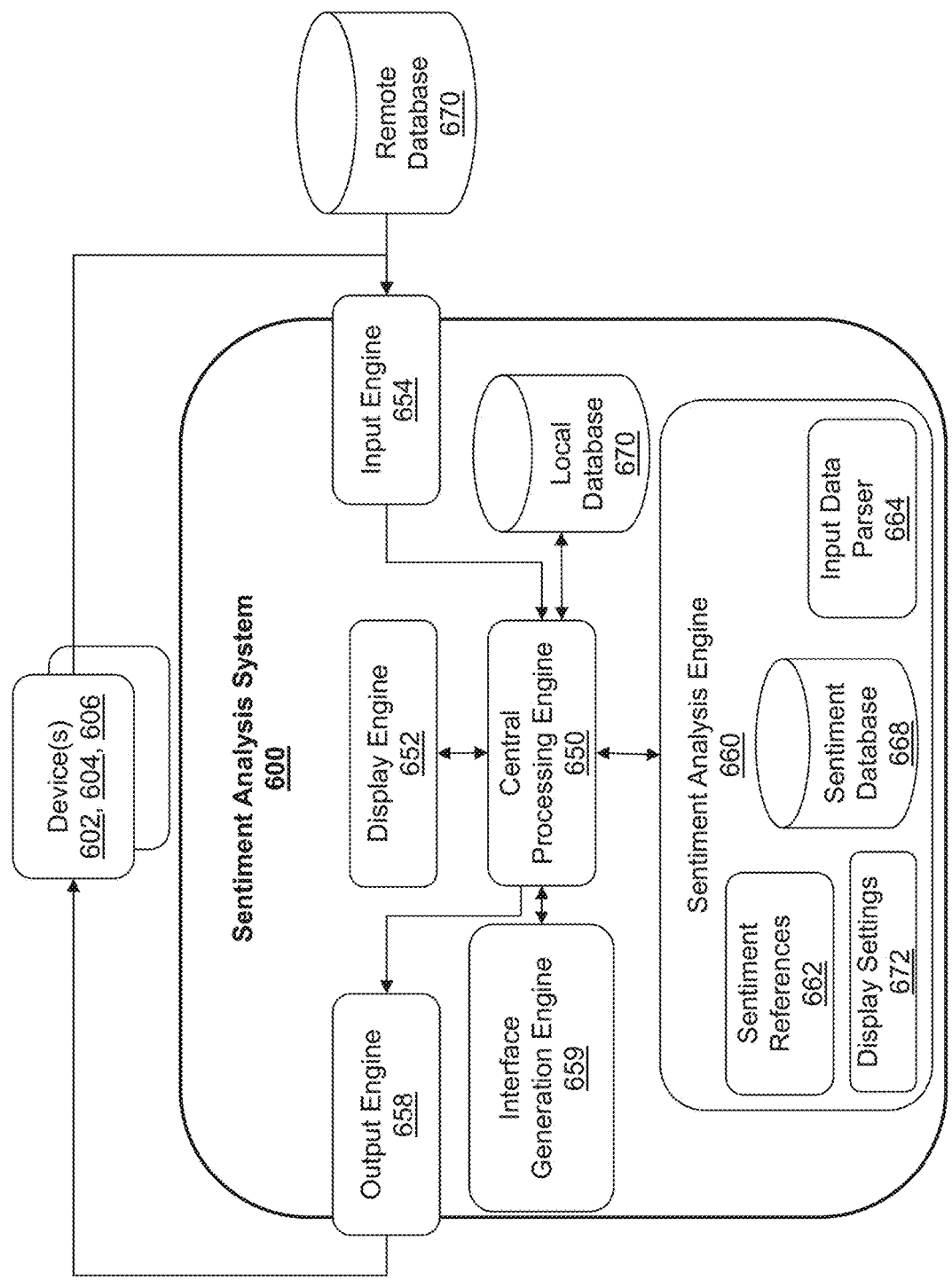
FIG. 6B depicts an example system block diagram sentiment analysis system, also illustrating how the components are in communication with each other.

FIG. 6B depicts an example system block diagram sentiment analysis system 600, also illustrating how the components are in communication with each other. The sentiment analysis system 600 may be the same as the sentiment analysis system 600 described in FIG. 6A, and herein. Also, the sentiment analysis system 600 includes many components. The components described herein are not meant to be exhaustive but only a sample of what components may be implemented in a sentiment analysis system 600. Some components may be combined and others may be removed or substituted with similar components.

The sentiment analysis system 600, as described in FIG. 6B, includes an input engine 654, a sentiment analysis engine 660, a central processing engine 650, an interface generation engine 659, a display engine 652, an output engine 658, and a local database 670. The device(s) 602, 604, and 606 can be the same devices as described herein, where each device optionally has access to view a graphical user interface of the sentiment analysis system 600. The remote database 670 and the device(s) 602, 604, and 606 may be present in the example computing environment 100 of FIG. 5 and communicate with the sentiment analysis system 600 over a local area network, the internet, or any other suitable means, such as the network 108. In some embodiments, the remote database 670, local database 670, and/or sentiment database 668 can store sentiment instructions, sentiment analysis tools, live video formatting instructions, animations to use with the sentiments, interface generation instructions, recorded live video, user account information associated with the device(s) 602, 604, and 606, and any other data that passes through the sentiment analysis system 600 that can be stored. It should be appreciated that the remote database 670, local database 670, and/or sentiment database 668 may each comprise a plurality of databases. The remote database 670 may also be a local network database or a local database 670 in some implementations, or as a part of the sentiment analysis engine 660 (for example, the sentiment database 668). It should be appreciated that in some embodiments, the sentiment database 668 may only comprise sentiment related metadata or instructions. For example, animations associated with one or more sentiments can be stored in the sentiment database 668.

The input engine 654 interfaces with one or more device(s) 602, 604, and 606 through a local area network or the Internet, such as the network 108. Device(s) 602, 604, and 606 may provide instruction or information to the sentiment analysis system 600. The input engine 654 receives and then sends any instructions or information received from the device(s) 602, 604, and 606 to the central processing engine 650.

The central processing engine 650 receives data and information from the input engine 654 (e.g., input data provided by an interacting device 604) and processes the data depending on the method described in FIG. 6A and herein, for example. In one embodiment, the central processing engine 650 sends data to a sentiment analysis engine 660, an interface generation engine 659, and a display engine 652. The central processing engine 650 also communicates with the display engine 652, the interface generation engine 659, and the output engine 658.

The sentiment analysis engine 660 includes sentiment references 662, input data parser 664, display settings 672, and a sentiment database 668. In some embodiments, certain aspects of the sentiment analysis engine 660 can be performed by a back-end server (e.g., back-end system 110) and other aspects can be performed by a viewer's or user's computing device (e.g., 602, 604, and 606). In some embodiments, the sentiment analysis system 600 can be just at least one of the device 602, 604, and/or 606 or a back-end server. The display settings 672 can comprise various customizations or preferences of a device 602, 604, and 606 based on how the user associated with the device 602, 604, and 606 prefers to view the various data. In some embodiments, the display settings 672 can be preconfigured by an administrator or are otherwise not customizable. For example, device(s) 602, 604, and 606 within a certain geographic area, or associated with a particular account type, may be instructed to display a user interface or data that is different from the user interface or data that device(s) 602, 604, and 606 within another geographic area, or associated with another particular account type, are instructed to display. The display settings 672 can be based partly on the information provided by the sentiment references 662 (the type of animation corresponding to a determined sentiment) and/or the input data parser 664 (e.g., the type of sentiment or overall sentiment that has been determined), but can also include any particular preferences for each individual live video or user account and/or instructions or settings pertaining to live video or user accounts generally.

The input data parser 664 of the sentiment analysis engine 660 can determine sentiments and overall sentiments based on input data. For example, the input data parser 664 can obtain input data from the input engine 654 via the central processing engine 650, and can compare the input data with data corresponding to known shapes and/or can provide the input data as an input to an AI model trained to output a perceived sentiment in order to determine a sentiment and optionally a confidence level of the determination. The input data parser 664 can aggregate determined sentiments to determine an overall sentiment.

The sentiment references 662 of the sentiment analysis engine 660 can determine which animations are associated with a particular type of sentiment determined by the input data parser 662. For example, the input data parser 664 can indicate to the sentiment references 662 what type of sentiment was determined, and the sentiment references 662 can identify an animation associated with the type of sentiment that was determined, retrieve the animation from the sentiment database 668 (e.g., if the animation is stored locally to the sentiment analysis system 600) and/or the remote database 670 (e.g., if the animation is stored externally from the sentiment analysis system 600), and transmit the animation to the central processing engine 650 for use by the interface generation engine 659.

A sentiment database 668 may also be a component of the sentiment analysis engine 660 and be used to store sentiment instructions, sentiment analysis tools, animations to use with the sentiments, user interface generation instructions, recorded live video, user account information associated with the device(s) 602, 604, and 606, and any other data that passes through the sentiment analysis system 600 that can be stored. Finally, some or all of the sentiment determinations made by the sentiment analysis engine 660 can be transmitted by the sentiment analysis engine 660 to the central processing engine 650 for eventual generation of display instructions and/or user interface data, where the device(s) 602, 604, and/or 606 can use the display instructions and/or user interface data to render and display a user interface, such as the user interface 200 of FIGS. 1-4C.

The interface generation engine 659 is optional and can create user interface data and updated user interface data based on input data and instructions received from the device(s) 602, 604, and 606. For example, the interacting device(s) 604 can send input data indicating a sentiment to the sentiment analysis system 600. Such input data and/or instructions may also include instructions on how the user interface should look or function as a result of the viewer providing an input corresponding to a sentiment. Also, for example, the interface generation engine 659 can send a request for an animation associated with a sentiment (where the sentiment may be determined by the input data parser 664, for example) to the remote database 670 via the output engine 658 and/or to the sentiment analysis engine 660. The remote database 670 can then send the requested animation to the input engine 654 and/or the sentiment analysis engine 660 can then send the requested animation to the central processing engine 650, and the central processing engine 650 can then process the requested animation. For example, the central processing engine 650 can modify the live video to include the requested animation (e.g., modify frames of the live video to include frames of the requested animation, add the animation to the live video in a separate layer, etc.), can create metadata for the animation that allows the app 130 to synchronize playback of the animation and the live video (e.g., the metadata can include a time code or range of time codes of the live video that indicates when the animation should be played), and/or the like. The central processing engine 650 can then send the processed animation to the interface generation engine 659 such that corresponding user interface data or updated user interface data can be generated. Upon completion of the creation or generation of the user interface data or the updated user interface data, the interface generation engine 659 can transmit the (updated) user interface data to the central processing engine 650 to determine any further updating by any other component of the sentiment analysis system 600. When any further updating is complete, the the output engine 658 transmits the (updated) user interface data to one or more devices 602, 604, and/or 606.

Some or all of the operations described herein as being performed by the interface generation engine 659 can instead be performed by the app 130 running on the devices 602, 604, and/or 606. For example, the app 130 can receive information from the sentiment analysis system 600 indicating the type of sentiment that was determined, and the app 130 can retrieve a corresponding animation (stored locally or externally), optionally modify the live video to include the animation or synchronize the animation with the live video so that the animation is played during a particular portion of the live video, and generate user interface data that the app 130 can then render and display to depict the user interface 200.

The display engine 652 is optional and receives the final instructions from the central processing engine 650 and/or the display settings 672 on how to display the user interface (for example, the user interface 200 in FIGS. 1-4C) for each device 602, 604, and 606. The display engine 652 outputs customized information (e.g., user interface data that, when executed, causes the rendering and display of a user interface corresponding to the preferences of a viewer or set of viewers) to the device(s) 602, 604, and 606 for viewing and interacting with the user interface rendered and displayed as a result of the customized information.

In an implementation, the sentiment analysis system 600 (or one or more aspects of the sentiment analysis system 600) can include, or be implemented in, a "virtual computing environment." As used herein, the term "virtual computing environment" should be construed broadly to include, for example, computer readable program instructions executed by one or more processors (e.g., as described below in the example of FIG. 5) to implement one or more aspects of the modules and/or functionality described herein. Further, in this implementation, one or more modules or engines (e.g., input engine 654, output engine 658, interface generation engine 659, display engine 652, central processing engine 650, and/or sentiment analysis engine 660) of the sentiment analysis system 600 may be understood as comprising one or more rules engines of the virtual computing environment that, in response to inputs received by the virtual computing environment, execute rules and/or other program instructions to modify operation of the virtual computing environment. For example, a request received from the device(s) 602, 604, and 606 may be understood as modifying operation of the virtual computing environment to cause the sentiment analysis engine 660 to determine sentiments or overall sentiments, the interface generation engine 659 to generate user interface data, the display engine 652 to display user interface data, and the output engine 658 to transmit the user interface data to the device(s) 602, 604, and/or 606. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by input engine 654 from the remote database 670. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the sentiment analysis system 600 as a virtual computing environment may advantageously enable executing different aspects or modules of the system on different computing devices or processors, which may increase the scalability of the system. Implementing one or more aspects of the sentiment analysis system 600 as a virtual computing environment may further advantageously enable sandboxing various aspects, data, or modules of the system from one another, which may increase security of the system by preventing, e.g., malicious intrusion into the system from spreading. Implementing one or more aspects of the sentiment analysis system 600 as a virtual computing environment may further advantageously enable parallel execution of various aspects or modules of the system, which may increase the scalability of the system. Implementing one or more aspects of the sentiment analysis system 600 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Creative Portals for Broadcasters

In some embodiments, the app 130 can provide analytics to broadcasters, allow the broadcasters to manage videos (e.g., price, metadata, schedule, etc.), and allow the broadcasters to publish the videos via a creative portal. The analytics can include statistics for videos, followers, tokens, and can be associated with a specific time range. The statistics can also include revenue breakdown (for example, amount earned from being a promoter v. a broadcaster) for a user.

The statistics can further include traffic breakdown. The traffic breakdown may include an analysis on the type of devices (for example, desktop v. mobile devices) used to view the video, from where within the streaming app 130 was the video located (for example, from popular video page, from the home page, from the user's profile page, etc.), and so on.

The follower's or viewer's analytics can include a breakdown of the follower's or viewer's interactions with the broadcaster, such as, for example, the tipping, promotions made by followers, durations of view, the amount earned by a user due to the follower's or viewer's promotions, etc.

Video statistics can include engagement statistics, such as, for example, values of sentiments provided by viewers, comments made, gifts received, etc. The broadcaster can also edit video information such as setting the category of the video, setting the cover page or preview image of the video, etc. In certain implementations, the cover page or the preview image can be customized based on viewer's characteristics (for example, the genre that the viewers like or the location of the viewers) to attract more viewers.

Advantageously, in some embodiments, the analytics can be provided to the broadcasters even though the broadcasters have not yet been verified by the system.

Figure 7:
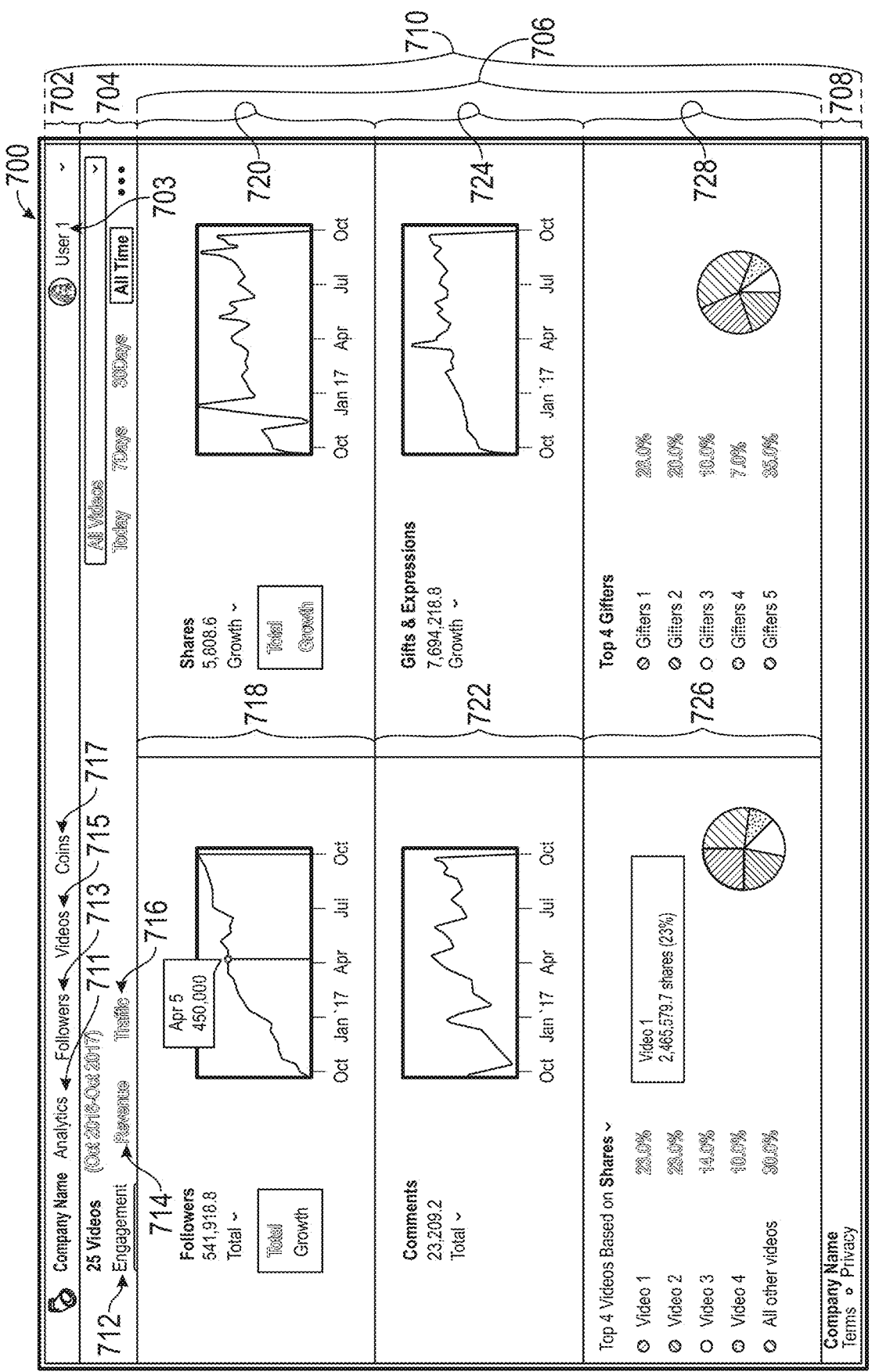
FIG. 7 depicts an example user interface for viewing video upload metrics data.
Figure 8:
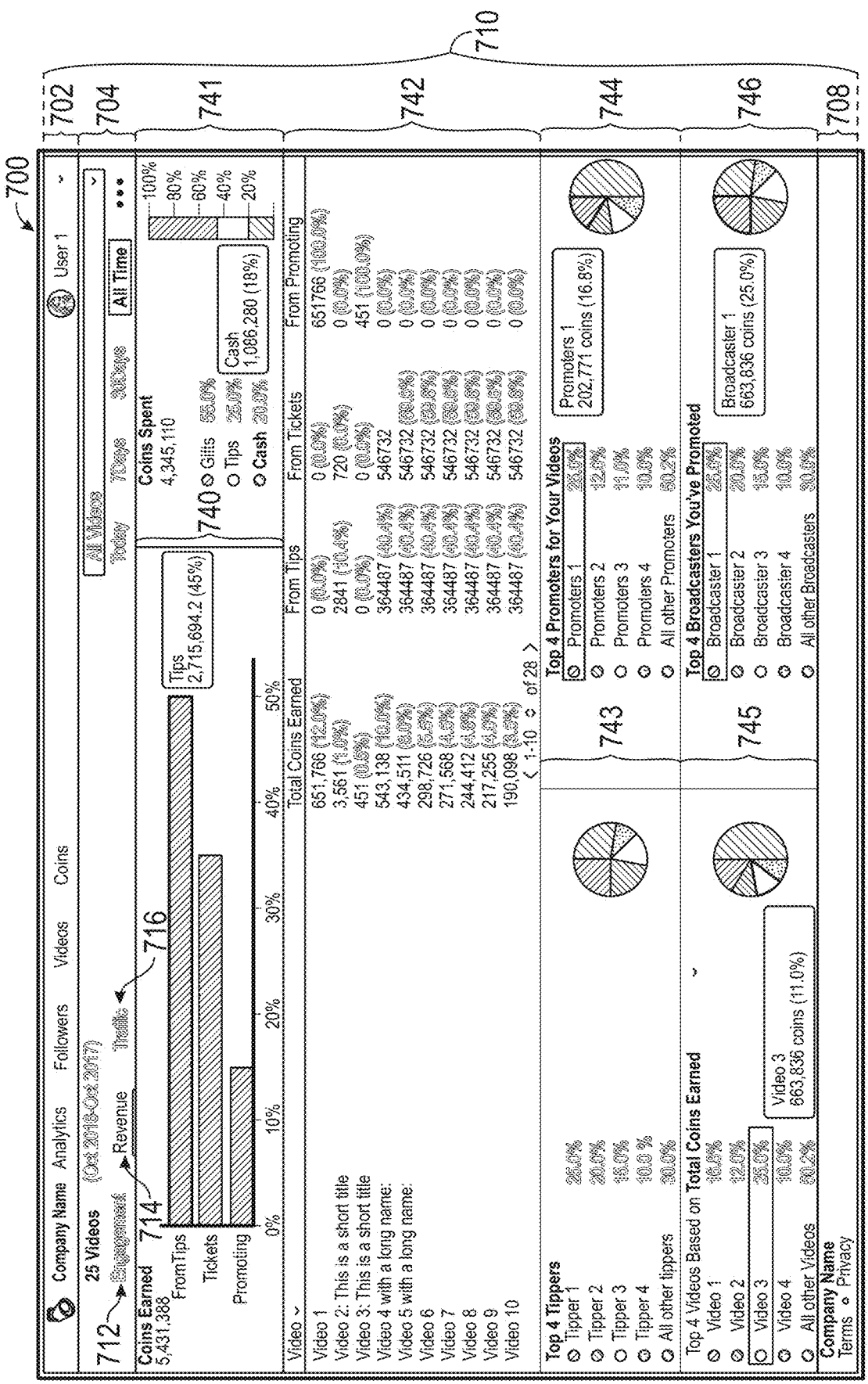
FIG. 8 depicts another example user interface for viewing video upload metrics data.
Figure 9:
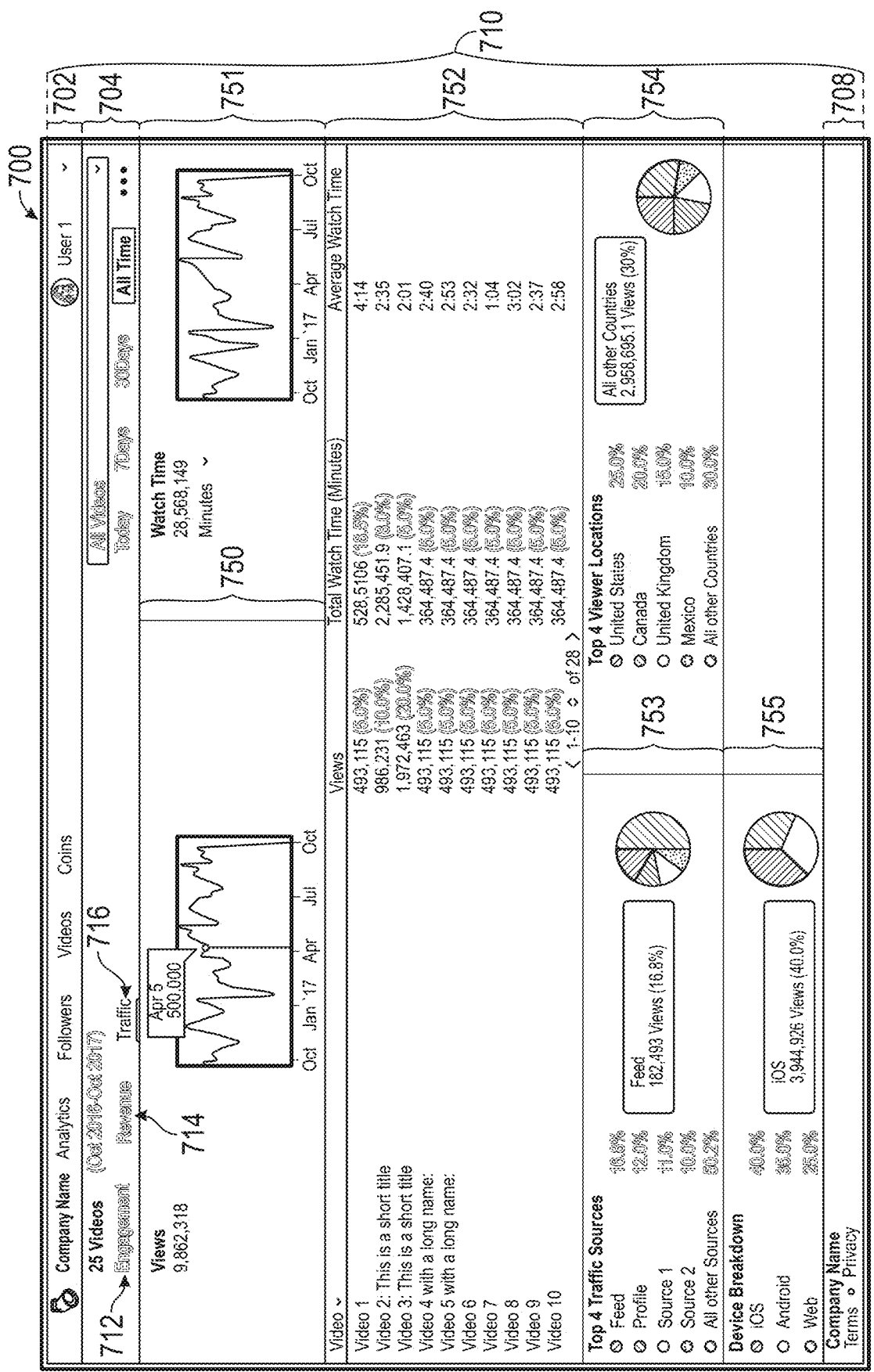
FIG. 9 depicts another example user interface for viewing video upload metrics data.
Figure 10:
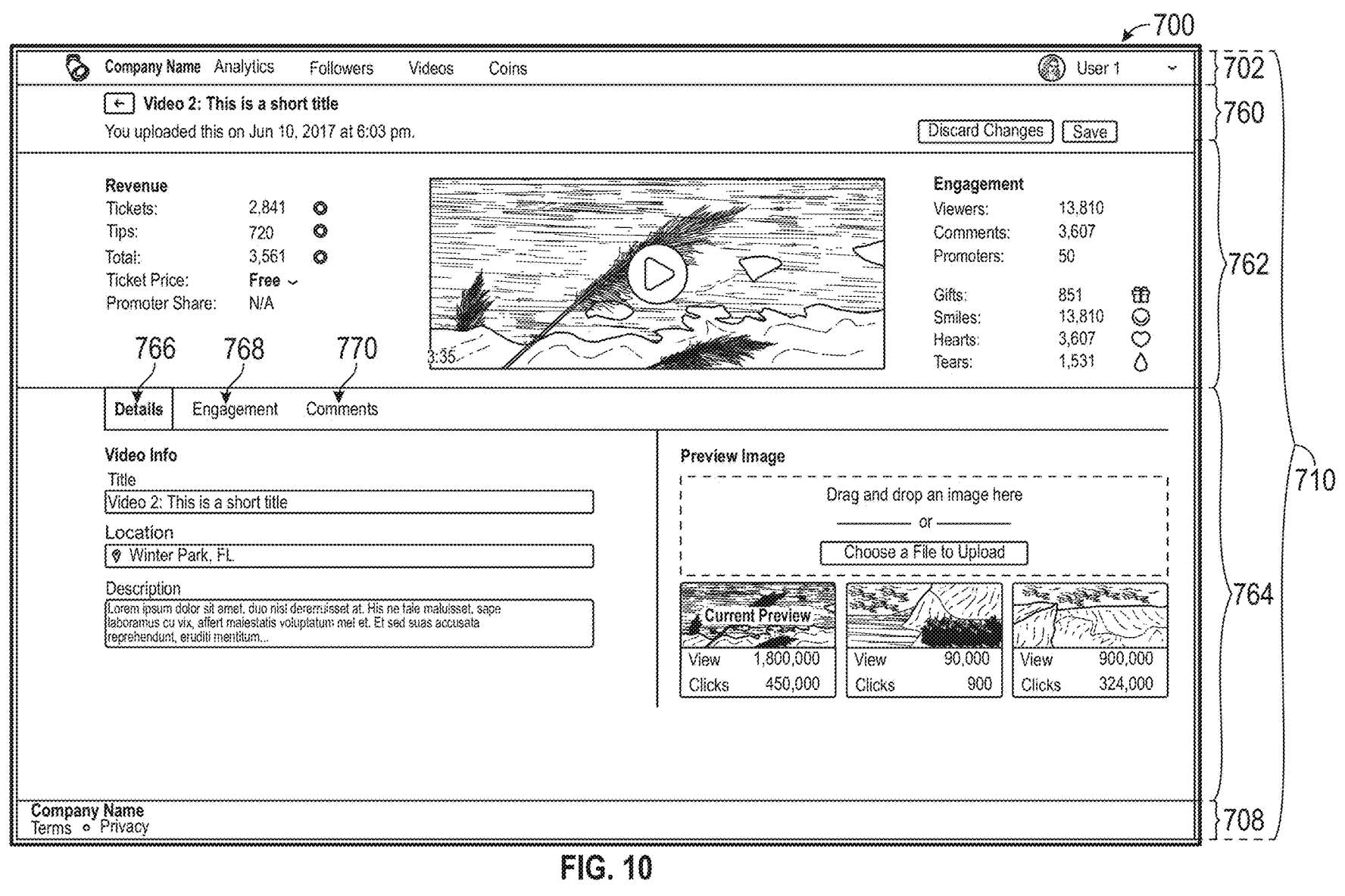

FIG. 7 depicts an example user interface 700 for viewing video upload metrics data. The user interface 700 can be generated by the app 130, based on user interface data generated by the streaming back-end system 110, and/or based on user interface data generated by the sentiment analysis system 600. The user interface 700 can include many different parts within the viewing screen 710. For example, a toolbar 702, a navigation bar 704, and various tiles (e.g., 718, 720, 722, 724, 726, and 728), and an info bar 708. The toolbar 702 can include links to access various different pages (e.g., pages associated with analytics 711, followers or viewers 713, videos 715, and coins 717), a link to a homepage, a user account 703 link to access and change settings associated with a user (e.g., settings related to payments, payouts, subscriptions, privacy, account status, account type, sharing content, followers, or the like). The navigation bar 704 can include data related to the number of videos uploaded within a certain timeframe, and a way to filter the videos (e.g., by date, file size, viewer count, revenue generation, popularity, or the like). The info bar 708 can include links to relevant terms and conditions or company or platform policies. In FIGS. 7-9, pages associated with analytics are depicted. In FIG. 10, a page associated with videos 715 is depicted. FIG. 7 depicts the engagement 712 tab.

The navigation bar 704 can also include links to pages of engagement 712, revenue 714, and traffic 716, for example. An example page of revenue 714 is depicted and described in relation to FIG. 8. An example page of traffic 716 is depicted and described in relation to FIG. 9. The engagement 712 page is shown here in FIG. 7 and can include various tiles 718, 720, 722, 724, 726, and 728, which, in some embodiments, can be rearranged (optionally to partially or fully overlap), hidden from view, or adjusted and customized by a user. A user can filter (e.g., by date or time) in navigation bar 704, which can change what is displayed in tiles 718, 720, 722, 724, 726, and 728 per the filter. In some embodiments, the tiles cannot be changed. In some embodiments, filters and adjustments to one tile by a user can affect what is displayed on another tile or other tiles. For example, a user can select a range of data points on the graph of tile 720 and the date filter can be updated to apply to all other tiles such that a corresponding range of data points is also selected automatically on the graphs of tiles 718, 722, and/or 724. It should be appreciated, that some tiles may not be affected by the update (e.g., the filtered content is the same as the pre-filtered content so no data was removed by the more stringent filter), and some tiles may not be updated at all (e.g., some tiles may display general information not tied to a particular date or range of dates).

Tile 718 can display information related to followers of the user (e.g., User 1). Followers can include people who subscribe to User 1, for example, to receive updates related to User 1. Followers can also be referred to as viewers. Information can include a number of followers and metrics related to growth over a period of time.

Tile 720 can display information related to shares of videos uploaded by the user (e.g., User 1). A share can include how many times a link to the video, or the video itself, was sent by one user of the platform to another user of the system, or a person that would be a new user of the system. Information can include number of shares and metrics related to growth over a period of time.

Tile 722 can display information related to comments on videos uploaded by the user (e.g., User 1). A comment can include written descriptions submitted by other users (e.g., users other than User 1) to the system (e.g., the app 130 running on User 1's device, the back-end system 110, the sentiment analysis system 700, etc.), which can include reviews and thoughts pertaining to the user (e.g., User 1) or pertaining to videos uploaded by the user. Information can include number of comments, the text of the comments, and metrics related to growth over a period of time.

Tile 724 can display information related to gifts and expressions related to videos uploaded by the user (e.g., User 1). Gifts and expressions can include digital items submitted by other users (e.g., users other than User 1) to the user (e.g., User 1), which can include items that may indicate a certain appreciation by other users for the user (e.g., User 1) like tokens, coins, badges, etc. Information can include number of gifts and/or expressions, the types of gifts and/or expressions, and metrics related to growth over a period of time.

Tile 726 can display information related to top videos uploaded by the user (e.g., User 1) based on shares (e.g., tile 720). For example, the videos that were shared the most would be listed in tile 726. Tile 726 can include percentages of the total shares and a chart (e.g., a pie chart) showing the proportion of shares each video corresponds to. In some embodiments, the pie chart can be selectable and the pie chart can display the number of shares corresponding to each video.

Tile 728 can display information related to top videos uploaded by the user (e.g., User 1) based on gifters (e.g., tile 724). For example, the videos that received the most gifts and/or expressions would be listed in tile 728. Tile 728 can include percentages of the total gifts and/or expressions received and a chart (e.g., a pie chart) showing the proportion of shares each video corresponds to. In some embodiments, the pie chart can be selectable and the pie chart can display the number of gifts and/or expressions corresponding to each video.

The page associated with followers 713 can include total tips and gifts given to the user (e.g., User 1) by other users. The page can also display total promotion earnings. The followers 713 page can also display the tip, gift, and promotion earnings, for each video uploaded by the user (e.g., User 1). The followers 713 page can also list all followers that follow the user (e.g., User 1) or individual videos. Information related to followers can include whether User 1 is following the follower, date the following relationship started, number of followers of the follower, a picture and username associated with the follower, number of videos uploaded to the system by the follower, an option to follow the follower back, and the like.

The page associated with coins 717 can include a coin balance, payout history, and an option to cash out the coins into a digital wallet, or convert the coins to a legal currency (USD, Euro, Yen, or the like) or cryptocurrency (e.g., Bitcoin, Etherium, or the like).

FIG. 8 depicts another example user interface 700 for viewing video upload metrics data. The user interface 700 can include many different parts within the viewing screen 710. For example, a toolbar 702, a navigation bar 704, and various tiles (e.g., 718, 720, 722, 724, 726, and 728), and an info bar 708. The toolbar 702 can include links to access various different pages (e.g., pages associated with analytics 711, followers or viewers 713, videos 715, and coins 717), a link to a homepage, a user account 703 link to access and change settings associated with a user (e.g., settings related to payments, payouts, subscriptions, privacy, account status, account type, sharing content, followers, or the like). The navigation bar 704 can include data related to the number of videos uploaded within a certain timeframe, and a way to filter the videos (e.g., by date, file size, viewer count, revenue generation, popularity, or the like). The info bar 708 can include links to relevant terms and conditions or company or platform policies. FIG. 8 depicts the revenue 714 tab of the page. On the revenue 714 tab, various tiles can be shown (e.g., tiles 741, 742, 743, 744, 745, and 746).

Tiles 740 and 741 depict coins earned and coins spent, respectively. The total number of coins earned and spent can be viewed, as well as subsets of the coins earned or spent. Metrics related to the earning and spending of coins can also be depicted showing where the coins came from or went to, and how many of them came in from a particular source or were spent for a particular purpose.

Tile 742 depicts a listing of videos uploaded by the user (e.g., User 1) and total coins earned for each video and how the coins were earned.

Tiles 743, 744, 745, and 746 depict rankings of tippers, promoters, broadcasters, and top videos based on total coins earned. A particular element of the ranking can be selected to highlight or delineate visually a section of a graph or chart (e.g., a pie chart) that corresponds to the selection. For example, in tile 745, "Video 3" is selected and a popup appears showing the total coins and a percentage of coins earned associated with the video. Also, the pie chart highlights the section of the chart corresponding to video 3.

FIG. 9 depicts another example user interface 700 for viewing video upload metrics data. The user interface 700 can include many different parts within the viewing screen 710. For example, a toolbar 702, a navigation bar 704, and various tiles (e.g., 718, 720, 722, 724, 726, and 728), and an info bar 708. The toolbar 702 can include links to access various different pages (e.g., pages associated with analytics 711, followers 713, videos 715, and coins 717), a link to a homepage, a user account 703 link to access and change settings associated with a user (e.g., settings related to payments, payouts, subscriptions, privacy, account status, account type, sharing content, followers, or the like). The navigation bar 704 can include data related to the number of videos uploaded within a certain timeframe, and a way to filter the videos (e.g., by date, file size, viewer count, revenue generation, popularity, or the like). The info bar 708 can include links to relevant terms and conditions or company or platform policies. FIG. 9 depicts the traffic 716 tab. On the traffic 716 tab, various tiles can be shown (e.g., tiles 750, 751, 752, 753, and 754).

Tile 750 shows the total views and a line graph based on dates where a user can hover over the graph to see how many views were received for all videos uploaded by the user (e.g., User 1) at a particular date. In some embodiments, a user can select a portion of the date range to adjust the tile statistics to show totals for that updated date range. Other tiles may also be updated to the new date range as well, in some embodiments.

Tile 751 shows the total watch time by all other users of all videos uploaded by a user (e.g., User 1). In some embodiments, a subset of videos can be selected to view traffic, rather than all the videos.

Tile 752 depicts the videos selected (e.g., all videos), the titles of the videos, views for each video and corresponding percentage of the views to the total number of views, total watch time and corresponding percentage of watch time to total watch time, and average watch time, for example.

Tiles 753, 754, and 755 depict rankings of top traffic sources, top viewer locations, and device breakdowns for all or a subset of videos. Charts and graphs can be shown where a user can select various portions of the graph or sources, locations, or devices, to view more information related to the selection in a popup or through other means (e.g., the interface can update to show the data once selected without a popup, or a new page can open based on the selection).

FIG. 10 depicts another example user interface 700 for viewing video upload metrics data. The user interface 700 associated with video 715 is depicted in FIG. 10 and can include many different parts within the viewing screen 710. For example, a toolbar 702, a summary bar 760, and various sections (e.g., 762 and 764), and an info bar 708. The toolbar 702 can include links to access various different pages (for example, pages associated with analytics 711, followers 713, videos 715, and coins 717), a link to a homepage, a user account 703 link to access and change settings associated with a user (e.g., settings related to payments, payouts, subscriptions, privacy, account status, account type, sharing content, followers, or the like). The info bar 708 can include links to relevant terms and conditions or company or platform policies.

The summary bar 704 can include data related to a selected video, including upload date and time, title, and buttons allowing a user (e.g. User 1) to save or discard any changes to the video upload.

Tile 762 allows a user to view statistics related to the uploaded video, such as tickets purchased to view the content, tips provided, and total value generated by the video. The tile 762 can also display a ticket price, which can be adjustable by a user (e.g., User 1) and a promoter share based on whether an associated promoter takes a certain percentage or number of value generated. Tile 762 can also display statistics related to engagement of the video, comments, promoters, and gifts. Also, tile 762 can display the number of each type of sentiment detected from viewers as described above with respect to FIGS. 1-4C and 6A-6B. For example, smiles, hearts, and tears can be input by the viewers according to FIGS. 6A and 6B, and the number of smiles, the number of hearts, and the number of tears detected can be displayed. Also, tile 762 can display a screenshot of the video with the capability of allowing the user (e.g., User 1) to play the video back within the interface.

Tile 764 depicts a details 766 page that shows video information that can include the title, location of the video (which can be detected using geolocation metadata), and a description of the video. These fields are editable and can be updated and saved by a user (e.g., User 1). Also, a preview image can be displayed based on an image uploaded by the user. For example, the user can upload the image in the user interface 700. The preview image can be applied to an uploaded or captured video as an initial image displayed to a viewer before a viewer selects a video to begin playback. Images previously uploaded by a user (e.g., User 1) and applied to videos uploaded or captured by the video can be displayed in the tile 764. Actual view and click rates for each of these uploaded or captured videos can also be displayed in the tile 764. Alternatively or in addition, predicted view and click rates can be displayed in the tile 764. The view and click rates can be predicted based on an analysis of other videos in the genre, videos uploaded by other users, videos uploaded by User 1, or any combination thereof.

Tile 764 also provides engagement 768 and comments 770 tabs. The engagement 768 tab can show what viewers watched the video and what promoters promoted the video. The viewers and promoters can be listed with additional information, such as whether they follow the user (e.g., User 1), the gifts or expressions provided to the user, whether the user follows a viewer or promoter, the capability of allowing the user to follow a viewer or promoter, or the like. The comments tab 770 can show what comments were left by the viewers or promoters, when the comments were left (e.g., date and time), username of the commenter, picture of the commenter associated with the commenter's account, and/or the comment text itself or a portion or preview of the comment text.

In some embodiments, the video 715 page can include information related to summarizing totals of videos posted, coins earned, views, and followers. The videos 715 page can also include metrics from "today," the last week, 30 days, all time, or a custom time period, and relative changes in coins earned, views, or time videos were watched as compared to previous time periods.

Administrative Portal

The streaming app 130 can be associated with an administrative portal for the internal use of app developers. The administrative portal may be implemented on the backend, such as, for example, the streaming backend system 110 shown in FIG. 5. The administrative portal can be used to track earnings, token histories, and statistics for various user accounts. The administrative portal can also include an audit log for tracking developer's interactions with the streaming app 130.

The administrative portal can also allow a company or the developers to set up rules for invites, referrals or advertisement campaigns, such as, for example, the number of tokens provided to newly registered user, or rules/links for batch referrals.

Web Portal

Although some examples of the streaming app 130 are described in the context of mobile application, in some embodiments, the mobile streaming app 130 may be implemented through a web portal, such as, for example, a browser instead of or in addition to in a mobile app. Advantageously, in some embodiments, the web portal can allow the mobile streaming app 130 to attract groups of users which may not use mobile applications to watch or broadcast live streams. For example, a game commenter may typically broadcast a live video feed via desktop rather than mobile phone.

Terminology

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "can," "e.g.," "for example," "such as," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. Further, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A video streaming system comprising:
one or more data storage devices configured to store:
animations associated with one or more sentiments; and
a plurality of computer-executable instructions;
one or more hardware computer processors in communication with the one or more data storage devices, the one or more hardware computer processors, when executing the plurality of computer executable instructions, configured to:
process at least a portion of a video stream broadcast by a first broadcaster device;
transmit a subset of the portion of the video stream to a first viewer device, wherein the first viewer device is configured to store and execute a video streaming application with an expression style mode;
transmit the subset of the portion of the video stream to a second viewer device, wherein the second viewer device is configured to store and execute the video streaming application with the expression style mode;
process input data received from the first viewer device;
parse the input data to determine a first sentiment associated with the input data;
transmit, to the first viewer device, first instructions for displaying an animation associated with the determined first sentiment concurrently with display of the video stream;
determine an overall sentiment based at least in part on the input data received from the first viewer device and second input data received from the second viewer device; and
in response to the determination of the overall sentiment:
transmit, to the first viewer device, second instructions for displaying an animation associated with the overall sentiment concurrently with display of the video stream; and
transmit, to the second viewer device, third instructions for displaying an animation associated with the overall sentiment concurrently with display of the video stream.

2. The system of claim 1, wherein the input data received from the first viewer device comprises an image drawn by a user associated with the first viewer device within a user interface presented by the first viewer device.

3. The system of claim 2, wherein the one or more hardware computer processors are further configured to:
compare the image drawn by the user with a plurality of shapes;
determine that the image drawn by the user corresponds to a first shape in the plurality of shapes;
determine that the first shape is associated with the first sentiment; and
associate the first sentiment with the image drawn by the user.

4. The system of claim 2, wherein the one or more hardware computer processors are further configured to:
apply the input data as an input to a trained artificial intelligence model, wherein the trained artificial intelligence model outputs an indication of the first sentiment as a result of the application; and
associate the first sentiment with the image drawn by the user.

5. The system of claim 1, wherein the one or more hardware computer processors are further configured to determine a confidence level associated with the determined first sentiment.

6. The system of claim 5, wherein the determined confidence level is above a threshold confidence level.

7. The system of claim 1, wherein the first instructions cause the first viewer device to display the animation associated with the determined first sentiment in a first layer and to display the video stream in a second layer, and wherein the first layer overlays the second layer.

8. The system of claim 1, wherein the first instructions cause the first viewer device to display the animation in a first portion of a user interface and to display the video stream in a second portion of the user interface that is different than the first portion.

9. The system of claim 1, wherein an intensity of the animation associated with the overall sentiment is based on one of a number or percentage of viewers watching the video stream that expressed the overall sentiment.

10. The system of claim 1, wherein the input data received from the first viewer device is associated with a first time that falls within a first time interval, wherein the second input data received from the second viewer device is associated with a second time that falls within the first time interval, and wherein third input data received from a third viewer device is associated with a third time that does not fall within the first time interval.

11. The system of claim 10, wherein the one or more hardware computer processors are further configured to determine the overall sentiment based on the input data, the second input data, and any other input data associated with a time that falls within the first time interval.

12. The system of claim 1, wherein the video stream comprises a live video stream.

13. The system of claim 1, wherein the input data comprises a time associated with first sentiment received from the first viewer device.

14. The system of claim 1, wherein the displayed animation associated with the determined first sentiment is overlaid on a portion of a screen of the first viewing device.

15. A computer-implemented method of streaming video comprising:
processing at least a portion of a video stream broadcast by a first broadcaster device;
transmitting a subset of the portion of the video stream to a first viewer device, wherein the first viewer device is configured to store and execute a video streaming application with an expression style mode;
transmitting the subset of the portion of the video stream to a second viewer device, wherein the second viewer device is configured to store and execute the video streaming application with the expression style mode;

processing input data received from the first viewer device;

parsing the input data to determine a first sentiment associated with the input data;

transmitting, to the first viewer device, first instructions for displaying an animation associated with the determined first sentiment concurrently with display of the video stream;

determining an overall sentiment based at least in part on the input data received from the first viewer device and second input data received from the second viewer device; and in response to the determination of the overall sentiment:

transmitting, to the first viewer device, second instructions for displaying an animation associated with the overall sentiment concurrently with display of the video stream; and transmitting, to the second viewer device, third instructions for displaying an animation associated with the overall sentiment concurrently with display of the video stream.

16. The computer-implemented method of claim 15, wherein the input data received from the first viewer device comprises an image drawn by a user associated with the first viewer device within a user interface presented by the first viewer device.

17. The computer-implemented method of claim 16, wherein parsing the input data to determine a first sentiment associated with the input data further comprises:

comparing the image drawn by the user with a plurality of shapes;

determining that the image drawn by the user corresponds to a first shape in the plurality of shapes;

determining that the first shape is associated with the first sentiment; and associating the first sentiment with the image drawn by the user.

18. A non-transitory computer-readable medium storing a set of instructions that are executable by one or more processors to cause the one or more processors to:

process at least a portion of a video stream broadcast by a first broadcaster device;

transmit a subset of the portion of the video stream to a first viewer device, wherein the first viewer device is configured to store and execute a video streaming application with an expression style mode;

transmit the subset of the portion of the video stream to a second viewer device, wherein the second viewer device is configured to store and execute the video streaming application with the expression style mode;

process input data received from the first viewer device;

parse the input data to determine a first sentiment associated with the input data;

transmit, to the first viewer device, first instructions for displaying an animation associated with the determined first sentiment concurrently with display of the video stream;

determine an overall sentiment based at least in part on the input data received from the first viewer device and second input data received from the second viewer device; and in response to the determination of the overall sentiment:

transmit, to the first viewer device, second instructions for displaying an animation associated with the overall sentiment concurrently with display of the video stream; and transmit, to the second viewer device, third instructions for displaying an animation associated with the overall sentiment concurrently with display of the video stream.

19. The non-transitory computer-readable medium of claim 18, wherein the input data received from the first viewer device comprises an image drawn by a user associated with the first viewer device within a user interface presented by the first viewer device.

20. The non-transitory computer-readable medium of claim 19, wherein the set of instructions, when executed, further cause the one or more processors to:

compare the image drawn by the user with a plurality of shapes;

determine that the image drawn by the user corresponds to a first shape in the plurality of shapes;

determine that the first shape is associated with the first sentiment; and associate the first sentiment with the image drawn by the user.

* * * * *